(12) United States Patent
Jerebko et al.

(10) Patent No.: US 8,175,349 B2
(45) Date of Patent: May 8, 2012

(54) SYSTEM AND METHOD FOR SEGMENTING VERTEBRAE IN DIGITIZED IMAGES

(75) Inventors: Anna Jerebko, West Chester, PA (US); Jiamin Liu, Drexel Hill, PA (US); Xiang Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1307 days.

(21) Appl. No.: 11/836,358

(22) Filed: Aug. 9, 2007

(65) Prior Publication Data

US 2008/0044074 A1  Feb. 21, 2008

Related U.S. Application Data

(60) Provisional application No. 60/838,048, filed on Aug. 16, 2006, provisional application No. 60/839,291, filed on Aug. 22, 2006, provisional application No. 60/839,280, filed on Aug. 22, 2006.

(51) Int. Cl.
*G06K 9/00* (2006.01)

(52) U.S. Cl. ........................................ 382/128

(58) Field of Classification Search .................. None
See application file for complete search history.

(56) References Cited

U.S. PATENT DOCUMENTS

| 6,205,348 | B1 * | 3/2001 | Giger et al. | 600/407 |
| 6,625,303 | B1 * | 9/2003 | Young et al. | 382/132 |
| 6,792,071 | B2 * | 9/2004 | Dewaele | 378/62 |
| 7,840,247 | B2 * | 11/2010 | Liew et al. | 600/407 |
| 2002/0136437 | A1 * | 9/2002 | Gerard et al. | 382/128 |
| 2003/0086596 | A1 * | 5/2003 | Hipp et al. | 382/128 |
| 2007/0223799 | A1 * | 9/2007 | Weiss | 382/131 |
| 2008/0044074 | A1 * | 2/2008 | Jerebko et al. | 382/128 |
| 2009/0285466 | A1 * | 11/2009 | Hipp et al. | 382/131 |

OTHER PUBLICATIONS

Peng et al: "Automated Vertebra Detection and Segmentation from the Whole Spine MR Images", Conference Proceedings : . . . Annual International Conference of the IEEE Engineering in Medicine and Biology Society, Conference 2005, vol. 3, 2005, pp. 2527-2530.

* cited by examiner

*Primary Examiner* — Andrew W Johns
*Assistant Examiner* — Tahmina Ansari
(74) *Attorney, Agent, or Firm* — Peter Withstandley

(57) ABSTRACT

A method for segmenting vertebrae in digitized images includes providing a plurality of digitized whole-body images, detecting and segmenting a spinal cord using 3D polynomial spinal model in each of the plurality of images, finding a height of each vertebrae in each image from intensity projections along the spinal cord, and building a parametric model of a vertebrae from the plurality of images. The method further includes providing a new digitized whole-body image including a spinal cord, fitting an ellipse to each vertebrae of the spinal cord to find the major and minor axes, and applying constraints to the major and minor axes in the new image based on the parametric model to segment the vertebrae.

33 Claims, 15 Drawing Sheets

SYSTEM AND METHOD FOR SEGMENTING VERTEBRAE IN DIGITIZED IMAGES

CROSS REFERENCE TO RELATED UNITED STATES APPLICATIONS

This application claims priority from "Parametric model based vertebrae segmentation", U.S. Provisional Application No. 60/838,048 of Liu, et al, filed Aug. 16, 2006, "RANSAC-based Algorithm for Spinal Cord Detection", U.S. Provisional Application No. 60/839,291 of Jerebko et al., filed Aug. 22, 2006, and "Band-pass filtering for segmentation and characterization of structures", U.S. Provisional Application No. 60/839,280 of Anna Jerebko, filed Aug. 22, 2006, the contents of all of which are herein incorporated by reference.

TECHNICAL FIELD

This disclosure is directed to the detection and segmentation of vertebrae structures in the spine.

DISCUSSION OF THE RELATED ART

Many anatomical structures in human body exhibit natural repetitiveness. For example, vertebrae of the spinal column have heights of certain range, and inter-vertebrae spaces and disks have a certain periodicity. Another example is the colon surface, which has periodic folds. The folds of the human brain also have a known range of frequencies. Besides the normal structures in the body, some lesions, such as breast cancer masses, have features such as specularity, where radial spikes that are strong indicators of malignancy can be captured at several ranges of frequency.

Whole-body MRI has high sensitivity and specificity for detection of bone-marrow metastases. Spine metastases detection is an important and time-consuming task. In recent years, computer aided detection (CAD) has proven useful for radiologists if used as a second reader in various applications of computed tomography (CT) and X-rays, such as colonic polyp, lung nodule, breast mass calcification detection, etc. Although MRI, including T1, T2 HASTE (half-fourier acquisition single-shot turbo spinecho) and T2-weighted Short Inversion Time Inversion Recovery (STIR) sequences, is becoming a popular screening modality, development of MRI CAD applications is more complicated than that of CT because of intensity in-homogeneities and higher noise level. In order to automatically detect metastasis in the vertebrae column and label vertebrae, a reliable segmentation of vertebrae body is needed. Robust segmentation of the spinal cord as a reliable reference object is useful for automatic vertebrae segmentation, metastasis detection, multi-modal registration, and curved MPR visualization. The few methods for vertebrae column segmentation in MR images available in recent literature, such as normalized cuts, are not suitable in the case of severe metastases where dissimilarity between healthy and affected vertebrae could be much greater than between vertebrae and other tissue.

SUMMARY OF THE INVENTION

Exemplary embodiments of the invention as described herein generally include methods and systems for automatically detecting the spinal cord in T2-weighted STIR images, segmenting vertebrae column and vertebrae body based on a given parametric representation of the spinal cord, and modeling naturally periodic structures using the domain knowledge of their periodicity. A method according to an embodiment of the invention involves constructing a model based on geometric primitives from purely anatomical knowledge of organ shape and rough variability limits. The basic intensity range of primary 'simple' objects is derived from expert knowledge of image formation for certain tissue types. A method according to an embodiment of the invention can be used for segmentation, characterization and feature extraction, abnormality detection, alignment of anatomical structures or lesions, spinal cord examination, metastasis screening, multi-modal registration, and curved MPR visualization. A 3D-polynomial model via RANSAC (random sample consensus algorithm) provides a fully automatic rapid and reliable estimate of the spinal centerline position and segmentation of the spinal cord.

Methods according to embodiments of the invention are suited to work with alterations in scanning protocols and pulse sequences, such as changes in the level of fat suppression, image resolution, acquisition plane (sagittal or coronal) and tolerant to severe pathological changes in organ appearance. A method according to an embodiment of the invention was successfully applied to the segmentation and alignment of human vertebrae column in MRI images of various pulse sequences as well as detection of collapsed vertebrae and vertebrae metastases. A method according to an embodiment of the invention can be applied to breast tomosynthesis and mammography images to allow extraction of a highly discriminative set of features which in conjunction with a classifier, such as a support vector machine, can reduce the number of false positives.

According to an aspect of the invention, there is provided a method for segmenting vertebrae in digitized images, including providing a plurality of digitized whole-body images, each the image comprising a plurality of intensities corresponding to a 3-dimensional grid of points, detecting and segmenting a spinal cord using 3D polynomial spinal model in each of the plurality of images, finding a height of each vertebrae in each image from intensity projections along the spinal cord, and building a parametric model of a vertebrae from the plurality of images.

According to a further aspect of the invention, detecting and segmenting a spinal cord in an image includes splitting the image into a plurality of sampling bins, randomly selecting a subset of these bins, randomly selecting one sample point from each selected bin, computing coefficient vectors for the 3D polynomial spinal model evaluated at each selected sample point, computing extrema points for the 3D polynomial spinal model, and evaluating the 3D polynomial spinal model in a local neighborhood volume of bright points within a curved cylinder built around the polynomial, if the extrema points satisfy pre-defined constraints.

According to a further aspect of the invention, if the volume is greater than a predefined minimum spinal cord volume, using least-squares to refine the coefficient vectors, taking into account only those points within a neighborhood of the 3D polynomial spinal model, evaluating the 3D polynomial spinal model in the neighborhood, and comparing the evaluation results to the total volume of the bright points within the curved polynomial spinal model.

According to a further aspect of the invention, the method comprises repeating the steps of randomly selecting a subset of these bins, randomly selecting one sample point from each bin, computing coefficient vectors, and evaluating the 3D polynomial spinal model until either the ratio of the volume to the total volume bright points is greater than a pre-determined threshold or the number of repeats has exceed a pre-determined maximum.

According to a further aspect of the invention, the 3D polynomial spinal model is defined by $$\begin{cases} x(t) = \sum_{i=0}^{n} a_{xi} t^i, \\ z(t) = \sum_{i=0}^{n} a_{zi} t^i, \\ y(t) \approx t, \end{cases}$$

wherein n is the polynomial order, x(t) represents a variation in the spinal curve in a coronal orientation, and z(t) represents a variation in the spinal curve in a saggittal orientation, the extrema points are defined by $$x'(t) = \sum_{i=1}^{n} a_{xi} i t^{i-1} = 0 \Rightarrow (x_{cj}, y_{cj}), \quad (3)$$

$$z'(t) = \sum_{i=1}^{n} a_{zi} i t^{i-1} = 0 \Rightarrow (z_{sj}, y_{sj}),$$

where $(x_{cj}, y_{cj})$ are extrema points in coronal orientation, $(z_{sj}, y_{sj})$ in the saggittal orientation, and j=1, ..., n−1, and wherein the subset of bins has (n+1) bins.

According to a further aspect of the invention, the coefficient vectors are constrained to satisfy $$\text{if } \begin{cases} a_{zn} < 0 \\ n \text{ is even} \end{cases}, \text{ then } z(t) \to -\infty,$$

and the constraints satisfied by the extrema are defined by $$|z_{sj} - z_{sj+1}| < LK_{j,j+1},$$

$$D_{j,j+a\ min} < |y_{sj} - y_{sj+1}| < D_{j,j+1\ max}$$

wherein $[D_{j,j+1\ min}, D_{j,j+1\ max}]$ are natural limits of a longitudinal distance and $LK_{j,j+1}$ is a poterior-anterior (lordotic and kyphotic) distance in a spinal curve, and $$|x_{sj} - x_{sj+1}| < S_c,$$

wherein $S_c$ is a scoliosis pathology limit observed from the plurality of images, and wherein the $[D_{j,j+1\ min}, D_{j,j+1\ max}]$ and $LK_{j,j+1}$ limits were set by an expert radiologist.

According to a further aspect of the invention, finding a height of a vertebrae from intensity projections along the spinal cord includes extracting a one-dimensional (1D) signal representing the spinal cord by projecting median intensity values along the spinal cord inside small sample circles adjacent to the front edge of the spinal cord within planes orthogonal to the spinal cord, filtering the 1D signal with a minimum rank filter having a width between a largest inter-vertebra space and a shortest vertebrae to be detected, and finding upper and lower boundaries of the vertebrae from intensity minima and maxima of the filtered 1D signal.

According to a further aspect of the invention, the method comprises removing spurious local minima caused by noise by setting an adaptive threshold $t_i$ for each vertebra satisfying $f(u_i) < t_i$, $f(d_i) < t_i$, wherein $f$ is the filtered 1D signal, $(u_i, d_i)$ are two local minima about the middle of each vertebra, and $t_i = \text{mean}(f(n_{i-1}), \ldots, f(n_{i+1})) - \text{std}(f(n_{i-1}), \ldots, f(n_{i+1}))$, where std is a standard deviation, and $n_i$ is a local minima of f, and imposing constraints $u_i - d_i < T_v$ and $d_{i+1} - u_i > T_s$ on the upper and lower vertebra boundary to maintain a minimum height of the vertebrae $T_v$ and inter-vertebrae space $T_s$.

According to a further aspect of the invention, building a parametric model of a vertebrae includes aligning all vertebrae in the plurality of images based on an extrema of a thoracic curve of the 3D polynomial spinal model, acquiring measurements of minor and major axis for each vertebra throughout plurality of images, wherein a typical sample vertebrae is represented by $$x_j = \begin{bmatrix} a_{j1} \\ \ldots \\ a_{jn} \\ b_{j1} \\ \ldots \\ b_{jn} \end{bmatrix};$$

wherein j is a sample number, $a_{ji}$ are the major axes, $b_{ji}$ are the minor axes, for i=1, ..., n, the number of vertebrae, computing a mean $$\bar{x} = \frac{1}{m} \sum_{j=1}^{m} x_j$$

and covariance S of the major and minor axes for each vertebrae across the plurality of images, using principle component analysis to find a set of modes representing the sample axes by solving $Sp_k = \lambda_k p_k$, wherein an arbitrary model sample x is defined in terms of the principle modes as $x = \bar{x} + Pd$, where $P = (p_1, \ldots, p_t)$ is a matrix of t eigenvectors, and $d = (d_1, \ldots, d_t)^T$ is the model parameter.

According to a further aspect of the invention, the method comprises retaining only those t modes that satisfy $$\sum_{j=1}^{t} \lambda_j \geq \frac{\text{confidence\_level}}{100\%} \sum_{j}^{2n} \lambda_j$$

for a pre-determined value of confidence_level, and wherein the model parameter d satisfies $-\sqrt{\lambda_j} \leq d_j \leq \sqrt{\lambda_j}$, for j=1, ..., t.

According to a further aspect of the invention, the method comprises providing a new digitized whole-body image including a spinal cord, fitting an ellipse to each vertebrae of the spinal cord to find the major and minor axes, and applying constraints to the major and minor axes in the new image based on the parametric model to segment the vertebrae.

According to a further aspect of the invention, fitting an ellipse to each vertebrae includes detecting edges of the vertebrae, plotting a straight line into the vertebrae in a plane orthogonal to the spinal cord starting from the edge of the spinal cord, selecting a point on the line, projecting a plurality of rays from the selected point at substantially equally spaced angles over a substantially semi-circular span, locating edge points lying on or close to the projected rays and selecting a point closest to the selected line point, locating an opposite point to the selected point at a same distance on a ray projected in an opposite direction, for each ray, collecting the 2D coordinates of all selected and opposite points on all rays, and fitting an ellipse to the collected points using a least squares technique.

According to a further aspect of the invention, the method comprises repeating the steps of selecting a point on the line, projecting a plurality m of rays, locating edge points, locating an opposite point, collecting the 2D coordinates, and fitting an ellipse for all points on the line, and selecting a fitted ellipse with a maximum area as a vertebrae model.

According to a further aspect of the invention, applying constraints to the major and minor axes includes projecting a vector x' of major and minor axes for the whole vertebrae into the model space according to $d=P^{-1}(x'-\bar{x})$ wherein $\bar{x}$ is a mean $$\bar{x} = \frac{1}{m}\sum_{j=1}^{m} x_j, P = (p_1, \ldots p_t)$$

is a matrix of t model eigenvectors, and $d=(d_1, \ldots, d_t)^T$ is a model parameter, wherein if all components of d do not satisfy the model constraints $-\sqrt{\lambda_i} \leq d_i \leq \sqrt{\lambda_i}$, for $i=1, \ldots, t$, wherein $\lambda_i$ are eigenvalues of $Sp_k=\lambda_k p_k$ wherein S is a covariance matrix of $\bar{x}$, then restricting values of d to be in the range, and computing a new axes vector $x''=\bar{x}+Pd$ using the restricted values of d.

According to a further aspect of the invention, if a vertebrae is missing in the new image, computing axis lengths of the missing vertebrae as an average from corresponding vertebrae in the plurality of images, and after applying constraints to detected ellipses, removing those components from the axes vector that correspond to the missing vertebrae.

According to another aspect of the invention, there is provided a method for segmenting vertebrae in digitized images including providing a digitized whole-body image including a spinal column, the image comprising a plurality of intensities corresponding to a 3-dimensional grid of points, fitting an ellipse to each vertebrae in the spinal column to find the major and minor axes of each vertebrae, and projecting a vector x' of the major and minor axes for each vertebrae into a model space according to $d=P^{-1}(x'-\bar{x})$ wherein x is a mean $$\bar{x} = \frac{1}{m}\sum_{j=1}^{m} x_j,$$

$P=(p_1, \ldots, p_t)$ is a matrix of t model eigenvectors, and $d=(d_1, \ldots, d_t)^T$ is a model parameter, wherein if all components of d do not satisfy model constraints $-\sqrt{\lambda_i} \leq d_i \leq \sqrt{\lambda_i}$, for $i=1, \ldots, t$, wherein $\lambda_i$ are eigenvalues of $Sp_k=\lambda_k p_k$ wherein S is a covariance matrix of $\bar{x}$, then restricting values of d to be in the range, and computing a new axes vector $x''=\bar{x}+Pd$ using the restricted values of d.

According to a further aspect of the invention, fitting an ellipse to each vertebrae in the spinal column includes detecting edges of the vertebrae, plotting a straight line into the vertebrae in a plane orthogonal to the spinal cord starting from the edge of the spinal cord, selecting a point on the line, projecting a plurality m of rays from the selected point at substantially equally spaced angles over a substantially semi-circular span, locating edge points lying on or close to the projected rays and selecting a point closest to the selected line point, locating an opposite point to the selected point at a same distance on a ray projected in an opposite direction, for each ray, collecting the 2D coordinates of all selected and opposite points on all rays, and fitting an ellipse to the collected points using a least squares technique.

According to a further aspect of the invention, the method includes providing a plurality of digitized whole-body images, each the image comprising a plurality of intensities corresponding to a 3-dimensional grid of points, detecting and segmenting a spinal cord using a 3D polynomial spinal model in each of the plurality of images, finding a height of each vertebrae in each image from intensity projections along the spinal cord, aligning all vertebrae in the plurality of images based on an extrema of a thoracic curve of the 3D polynomial spinal model, acquiring measurements of minor and major axis for each vertebra throughout plurality of images, wherein a typical sample vertebrae is represented by $$x_j = \begin{bmatrix} a_{j1} \\ \ldots \\ a_{jn} \\ b_{j1} \\ \ldots \\ b_{jn} \end{bmatrix};$$

wherein j is a sample number, $a_{ji}$ are the major axes, $b_{ji}$ are the minor axes, for $i=1, \ldots, n$, the number of vertebrae, computing a mean $$\bar{x} = \frac{1}{m}\sum_{j=1}^{m} x_j$$

and covariance S of the major and minor axes for each vertebrae across the plurality of images, and using principle component analysis to find a set of modes representing the sample axes by solving $Sp_k=\lambda_k p_k$, wherein an arbitrary model sample x is defined in terms of the principle modes as $x=\bar{x}+Pd$, where $P=(p_1, \ldots, p_t)$ is a matrix of t eigenvectors, and $d=(d_1, \ldots, d_t)^T$ is the model parameter.

According to a further aspect of the invention, the method includes retaining only those t modes that satisfy $$\sum_{j=1}^{t} \lambda_j \geq \frac{\text{confidence\_level}}{100\%} \sum_{j}^{2n} \lambda_j,$$

wherein confidence_level is predefined, and wherein the model parameter d satisfies $-\sqrt{\lambda_j} \leq d \leq \sqrt{\lambda_j}$, for $j=1, \ldots, t$.

According to a further aspect of the invention, the 3D polynomial spinal model is defined by $$\begin{cases} x(t) = \sum_{i=0}^{n} a_{xi} t^i, \\ z(t) = \sum_{i=0}^{n} a_{zi} t^i, \\ y(t) \approx t, \end{cases}$$

wherein n is the polynomial order, x(t) represents a variation in the spinal curve in a coronal orientation, and z(t) represents a variation in the spinal curve in a saggittal orientation, and wherein the coefficient vectors are constrained to satisfy $$\text{if } \begin{cases} a_{zn} < 0 \\ n \text{ is even} \end{cases}, \text{ then } z(t) \to -\infty,$$

According to another aspect of the invention, there is provided a program storage device readable by a computer, tangibly embodying a program of instructions executable by the computer to perform the method steps for segmenting vertebrae in digitized images.

DETAILED DESCRIPTION OF EXEMPLARY EMBODIMENTS

Figure 1:
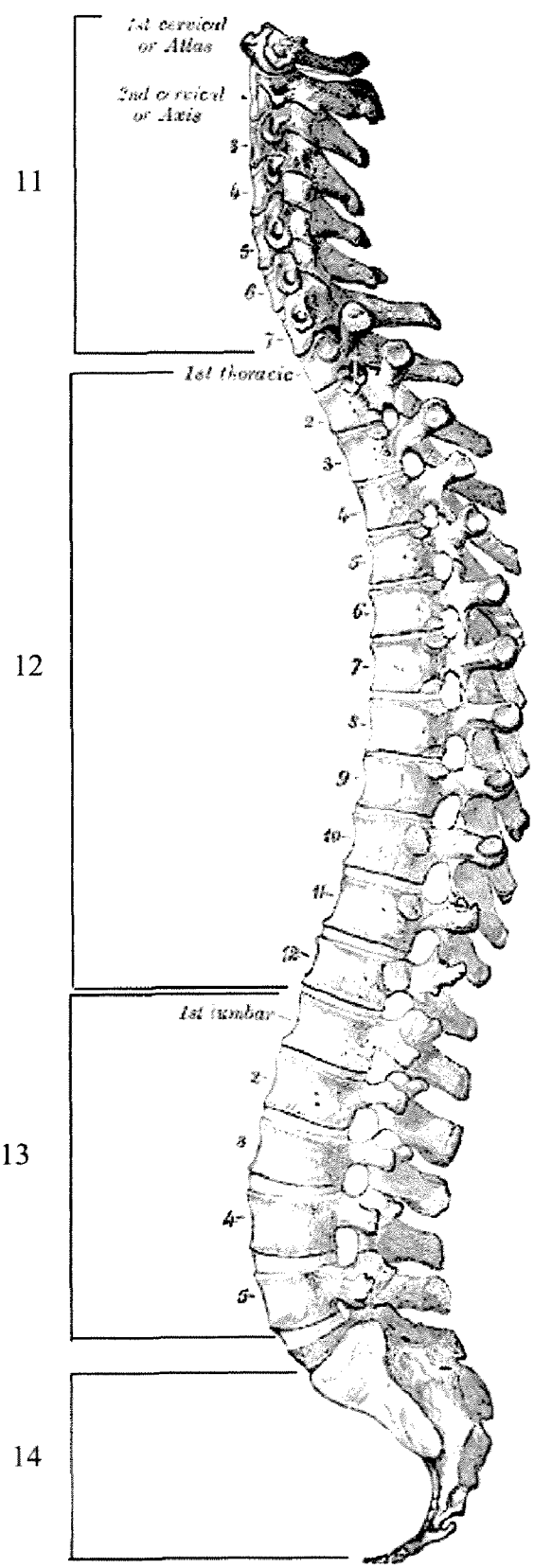
FIG. 1 depicts a side view of an exemplary vertebral column, according to an embodiment of the invention.

Exemplary embodiments of the invention as described herein generally include systems and methods for detection and segmentation of vertebrae structures in the spine. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A method for vertebrae segmentation according to an embodiment of the invention assumes that (1) the spinal cord, tumors and blood vessels are among the brightest structures in the image for number of MRI pulse sequences (e.g. T2, T2 STIR, HASTE), (2) bones are surrounded by cortical bone that does not generate a signal in MR images, and therefore appears black, and looks like black contour around each bone, (3) vertebrae are perpendicular to the spinal cord, and that (4) each vertebra can be represented by a cylinder. A side view of an exemplary vertebral column, from Gray's Anatomy of the Human Body, published in 1918, is depicted in FIG. 1. This view indicates the cervical 11, thoracic 12, lumbar 13 and pelvic 14 regions, and the individual vertebrae in each region are numbered. The pelvic region includes the sacrum and coccygeal vertebrae.

Figure 9:
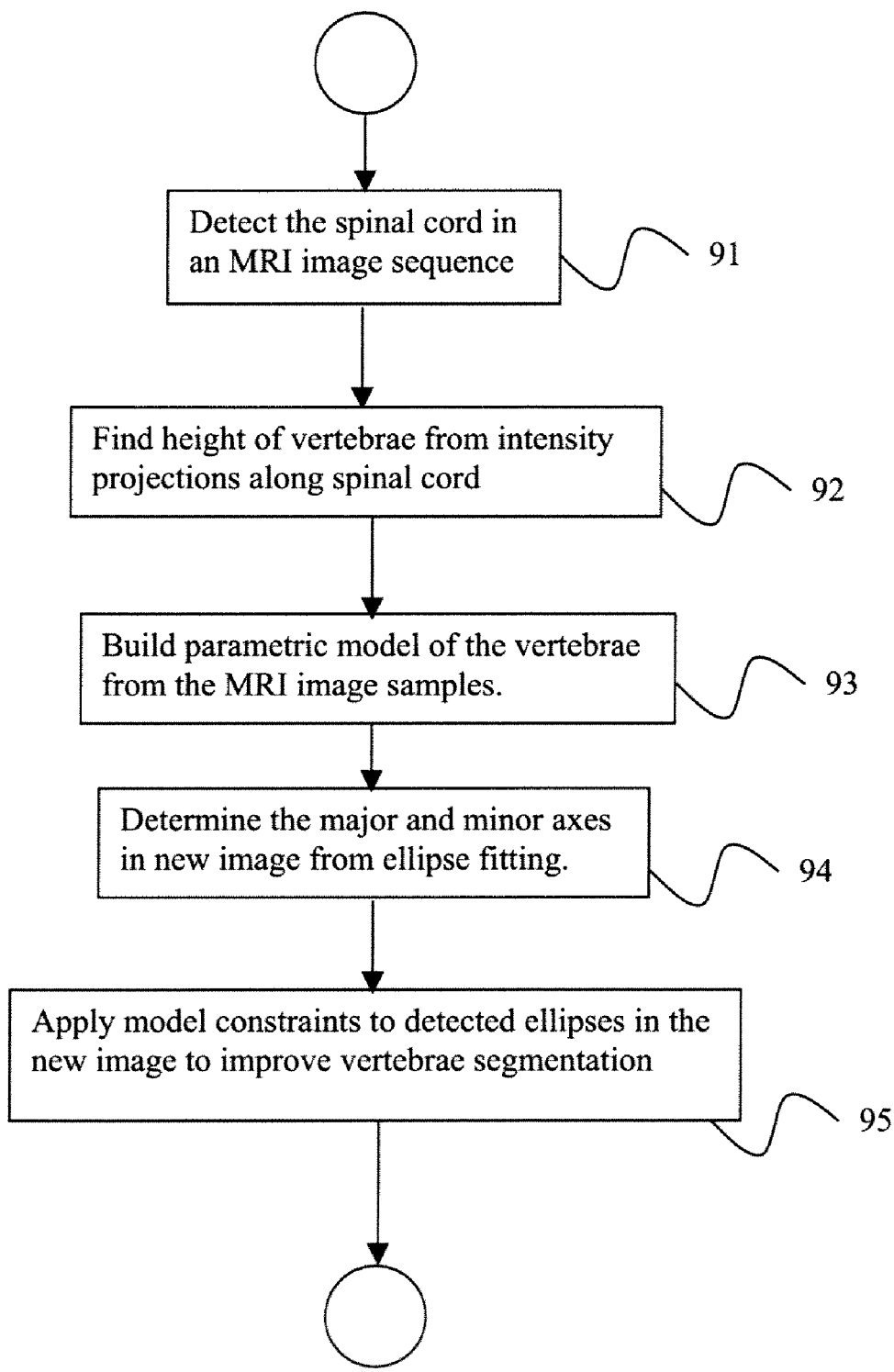
FIG. 9 is a flow chart of a vertebrae segmentation method according to an embodiment of the invention includes five stages.

A vertebrae segmentation method according to an embodiment of the invention includes five stages, depicted in the flow chart of FIG. 9. Referring now to the figure, given a training set of MRI images, a first step 91 is to detect the spinal cord from the MRI sequences. Second, at step 92, the height of a cylinder for representing a vertebrae is determined from intensity projections along spinal cord. Third, at step 93, a parametric model of the vertebrae is built from the training set. Then, given a new image, the major and minor axes of each vertebrae are determined from ellipse fitting at step 94. Finally, at step 95, the model constraints are applied to the detected ellipses in the new image to improve the segmented vertebrae. There is also an optional preprocessing stage that includes image intensity inhomogeneity correction, scaling and thresholding.

The spinal cord is one of the most reliable reference objects in MR images and appears consistently bright in common MRI scanning protocols, such as HASTE, T2, and T2 STIR. Other tissue intensities however vary significantly with minor changes in the scanning protocols and levels of fat suppression. The number and shape of hyper-intense objects in the image, other than spinal cord, is not known a priori, as it varies from patient to patient depending on the primary tumor location, severity of the metastatic process, amount of body fat, condition of inter-vertebrae disks, pathological changes in the organ appearance, etc. A method according to an embodiment of the invention allows robust fitting and segmentation of spinal cord without extraction of a full collection of other objects present in the image.

An exemplary spinal cord is shown in FIG. 1. A typical human spinal cord includes three curves: the cervical curve 11, which is convex forward, the thoracic curve 12, which is concave forward, and the lumbar curve 13, which is convex forward. It is convenient to model it with a curve having 3 extrema points. According to an embodiment of the invention, the spinal cord is modeled as a global $4^{th}$-order 3D-polynomial:

$$\begin{cases} x(t) = \sum_{i=0}^{n} a_{xi} t^i, \\ z(t) = \sum_{i=0}^{n} a_{zi} t^i, \\ y(t) \approx t, \end{cases} \quad (1)$$

where n=4, x(t) represents the variation in the spinal curve from patient side to side (coronal orientation), and z(t) represents the variation in the spinal curve from patient's back to front (saggittal orientation). It is to be understood, however, that embodiments of the invention are not limited to using a $4^{th}$-order polynomial, and any polynomial model having the desired extrema can be used according to other embodiments of the invention. Furthermore, in this parametric representation, the polynomial can also be constrained to have the sacrum, the end of the vertebrae column, always pointing back:

$$\text{if } \begin{cases} a_{zn} < 0 \\ n = 4 \text{ (is even)} \end{cases}, \text{ then } z(t) \to -\infty. \quad (2)$$

Polynomial extrema points in the saggittal orientation correspond to cervical, thoracic and lumbar curves. If a patient's spine also has a lateral curvature, a pathology known as scoliosis, it will be reflected in x(t) variations. Polynomial extrema points are computed from:

$$x'(t) = \sum_{i=1}^{n} a_{xi} i t^{i-1} = 0 \Rightarrow (x_{cj}, y_{cj}), \quad (3)$$

$$z'(t) = \sum_{i=1}^{n} a_{zi} i t^{i-1} = 0 \Rightarrow (z_{sj}, y_{sj}),$$

where $(x_{cj}, y_{cj})$ are extrema points in coronal orientation, $(z_{sj}, y_{sj})$ in the saggittal orientation, and j=1, . . . , n−1.

Next, the distances between polynomial extrema points in saggittal orientation are constrained to be within natural limits of longitudinal $[D_{j,j+1\ min}, D_{j,j+1\ max}]$ and the poterior-anterior (lordotic and kyphotic) $LK_{j,j+1}$ distances between cervical, thoracic and lumbar curves:

$$|z_{sj} - z_{sj+1}| < LK_{j,j+1},$$

$$D_{j,j+1\ min} < |y_{sj} - y_{sj+1}| < D_{j,j+1\ max} \quad (4)$$

The $[D_{j,j+min}, D_{j,j+max}]$ and $LK_{j,j+1}$ limits were set by an expert radiologist.

The lateral distances between coronal extrema points are also constrained to be within the scoliosis pathology limit $S_c$, observed from our training set:

$$|z_{sj} - x_{sj+1}| < S_c \quad (5)$$

A scanned patient section does not necessarily contain all three curves described above, but this modeling approach allows one to extrapolate and guess their approximate location. The $4^{th}$ short curve, the pelvic curve, extends from sacrovertebral articulation to coccyx and, most often, is not visible in thoracic section of the whole body scan. It could be segmented together with pelvic bones using the spinal cord points as reference points.

The model parameters are estimated using random sample consensus (RANSAC) algorithm with subsequent least squares based fitting refinement. The RANSAC method is used for parametric shape fitting with a priori knowledge of the approximate object scale in the presence of highly correlated outliers that often constitute more than 50% of the image.

At least n+1 sample points are needed to define an $n^{th}$ order polynomial. To accelerate fitting of a polynomial of an approximately known scale, defined by the limits on the distances between the extrema points, defined in EQ. (4), above, the image is split into M×(n+1) sampling bins. Bins are longitudinally evenly spaced throughout the image; each bin b contains all axial (horizontal) slices in the region $[y_b, y_b+\max(y)/(M(n+1))]$. The factor M constrains the scaling/warping degree of freedom for the polynomial.

Figure 10:
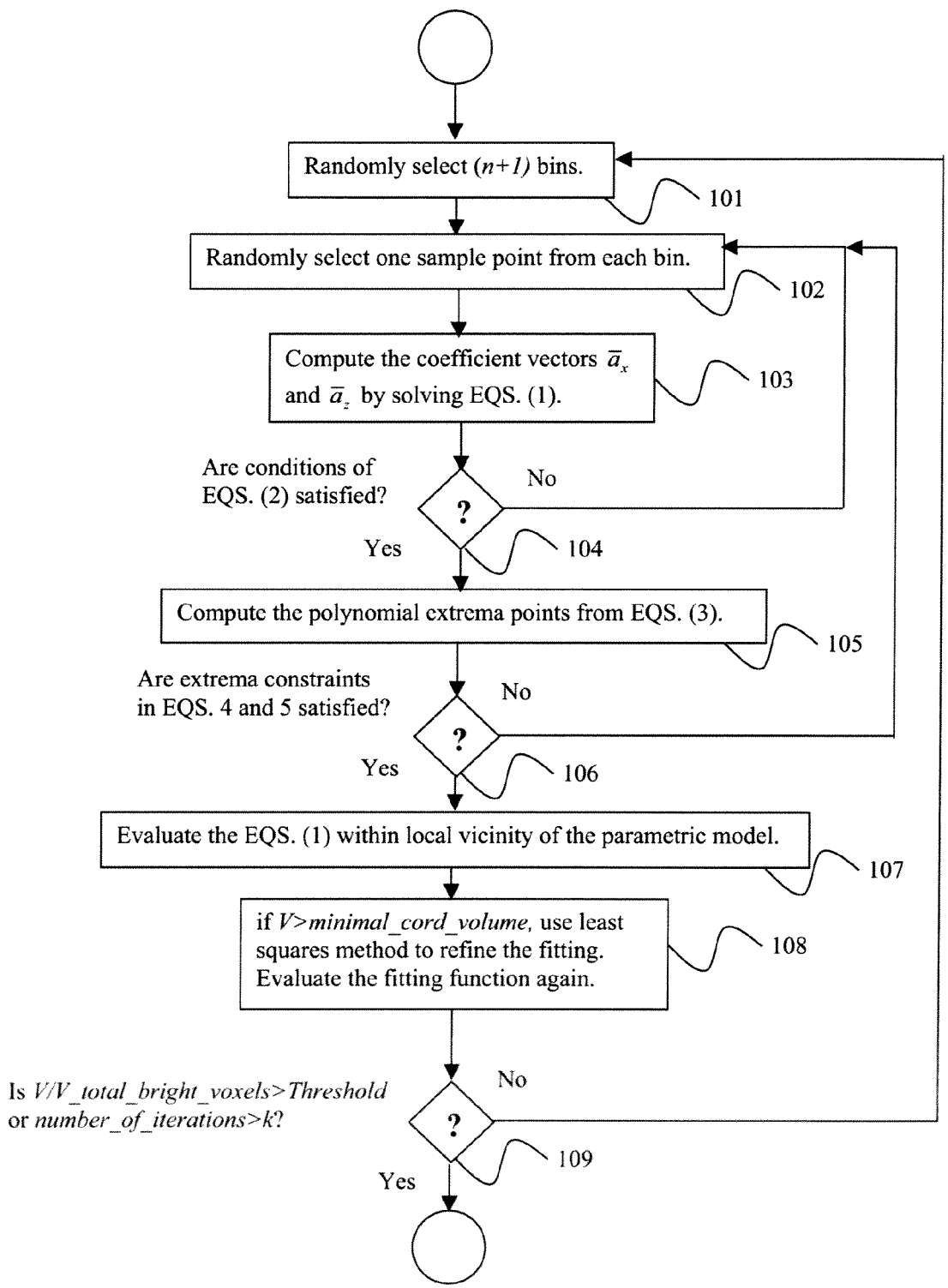
FIG. 10 is a flow chart of a spinal cord model fitting method according to an embodiment of the invention.

A flow chart of a spinal cord model fitting according to an embodiment of the invention is presented in FIG. 10. Given an image that has been split into sampling bins, the model fitting begins at step 101 by randomly selecting (n+1) of these bins. At step 102, one sample point is randomly selected from each bin. The coefficient vectors $\bar{a}_x$ and $\bar{a}_z$ are computed at step 103 by solving EQS. (1) for the sample points. If the conditions in EQS. (2) are satisfied at step 104, the polynomial extrema points are computed from EQS. (3) at step 105, otherwise the model fitting goes back to step 102 to select another set of sample points. If, at step 106, all extrema constraints (EQS. (4) and (5)) are satisfied, then the fitting function (EQS. (1)) is evaluated step 107 within a local neighborhood of the parametric model as a volume V of bright voxels within a curved cylinder built around the polynomial, otherwise the model fitting returns to step 102. The size of the neighborhood is the average human spinal cord radius R+delta, a small increment. At step 108, if V is greater than a minimum spinal cord volume, the least-squares method is used to refine the coefficient vectors, taking into account only those voxels within the R+delta neighborhood of the spinal cord model. This shifts the model more towards the actual spinal cord center-line. The fitting function is evaluated again and compared to the current best fitness model, the total volume of the bright voxels in the curved polynomial spinal model. At step 109, the model fitting returns to step 101 for another iteration unless either the ratio of V to the total volume of bright voxels is greater than a pre-determined threshold or the number of iterations has exceed a pre-determined maximum k.

The convergence speed depends on the percentage of outliers in the image: that is, hyperintense points in the image not belonging to the spinal cord, which, in turn, depends on the exact pulse sequence, quality of fat suppression and degree of metastatic process. The maximum number of iterations k is estimated as:

$$k = \frac{\log(P_0)}{\log(1-w^m)} + \frac{\sqrt{1-w^m}}{w^m}, \quad (6)$$

where m=n+1, $P_0$ is the probability of seeing only bad samples (possibly it was up to 80% for some data sets), and w is probability of good (inlier) samples.

Figure 2:
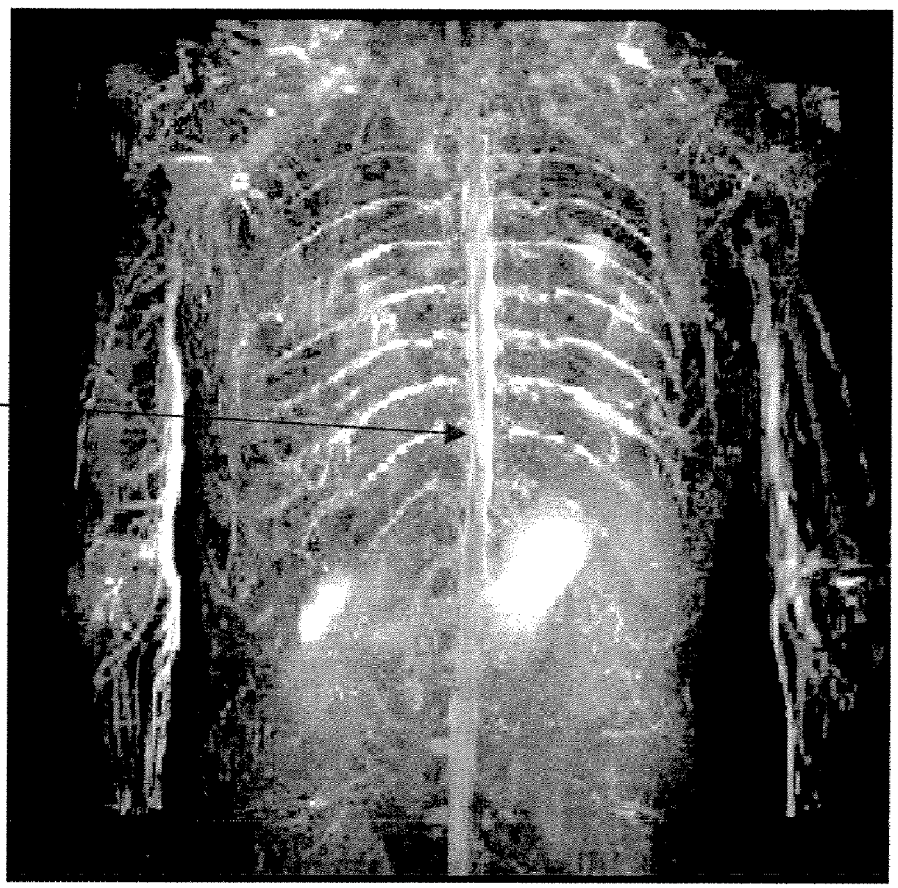
FIG. 2 depicts spinal cord detection result in a maximum intensity projection image, according to an embodiment of the invention.

The spinal cord is segmented as a curved 3D cylinder around the detected centerline. A spinal cord detection result 21 in a maximum intensity projection image is shown in FIG. 2.

The detection results were visually evaluated in 77 T2 STIR and 5 HASTE images from different hospitals. Results appeared satisfactory in all images. Segmentation accuracy was numerically evaluated using manually segmented ground truth (GT) in 35 T2 STIR images with average voxel size of 1.25×1.25×6 mm. The average segmentation accuracy, estimated as ratio of overlapping of automatically detected (AD) and GT spinal cord volumes to the GT volume, was 91% with standard deviation (STD) of 14%. The accuracy of centerline position evaluated as average distance from all GT spinal cord voxels to the AD centerline was 4.4 mm with STD of 1.9 mm. The presence of collapsed vertebrae and edema in 1 patient and multiple vertebrae metastasis in 12 patients only affected the segmentation accuracy in one case, where all vertebrae had severe metastatic changes of image intensity similar to the spinal cord and with no visible boundary. As a result, the spinal cord centerline in this one case was shifted toward the center of the vertebral body. This had a slight negative effect on the test set statistics.

Figure 11:
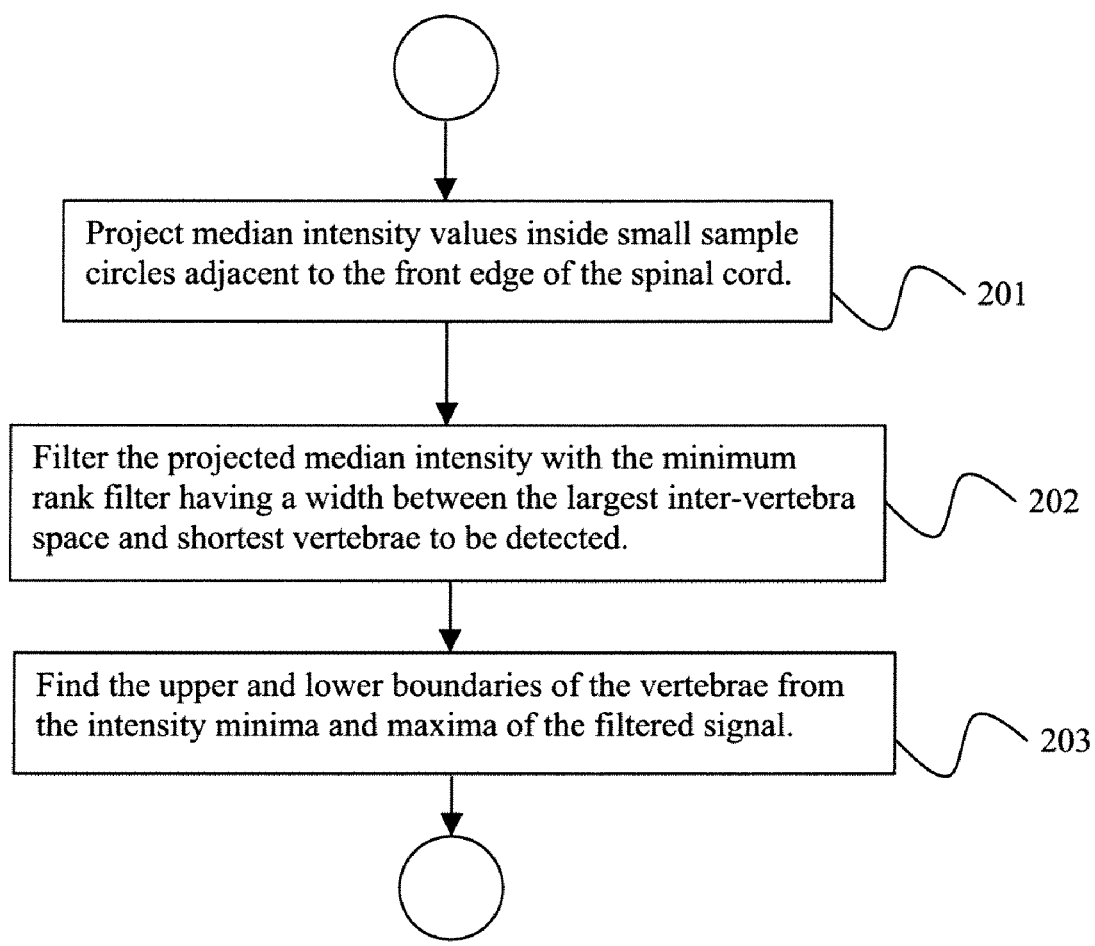
FIG. 11 is a flow chart of a method for determining the vertebra boundary, according to an embodiment of the invention.

The second stage, step 92 of FIG. 9, determines the vertebra boundary in a vertical direction using intensity projections along the spinal cord and bandpass filter frequency analysis. A vertebrae model according to an embodiment of the invention only fits the vertebrae body, excluding the processes and pedicles. It can be represented by a section of an elliptical cylinder adjacent to the spinal cord. It can be assumed that the imaginary planes that separate vertebrae from each other and from inter-vertebrae disks are orthogonal to the spinal cord. A flow chart of a method according to an embodiment of the invention for determining the vertebra boundary is shown in FIG. 11. Referring now to the figure, vertebrae separating planes are detected by analyzing a one-dimensional signal representing the spinal column. This 1D signal is extracted at step 111 by projecting median intensity values along the spinal cord inside small sample circles adjacent to the front edge of the spinal cord within the planes orthogonal to it. This extracted 1D signal is referred to herein as the projected median intensity.

Normal vertebra is composed of spongy bone, containing bone marrow, which is surrounded by compact (cortical) bone. The most interesting property of cortical bone from an MRI point of view is that it does not generate a signal in MRI and therefore appears consistently hypointense in any pulse sequence, while vertebra and disks may change their appearance depending on the presences of metastases or other diseases. Sometimes inter-vertebrae disks are not visible in the whole vertebral column.

To extract reliable information from the projected signal and skip inconsistent high intensity peaks like disks and lesions, the minimum rank filter with a width between the largest inter-vertebra space and shortest vertebrae to be detected is applied to the projected median intensity at step 112. The upper and lower frequency thresholds for capturing the periodicity of the structures of interest are established using domain knowledge. These thresholds define frequency bands for filtering the original signal.

Figure 3:
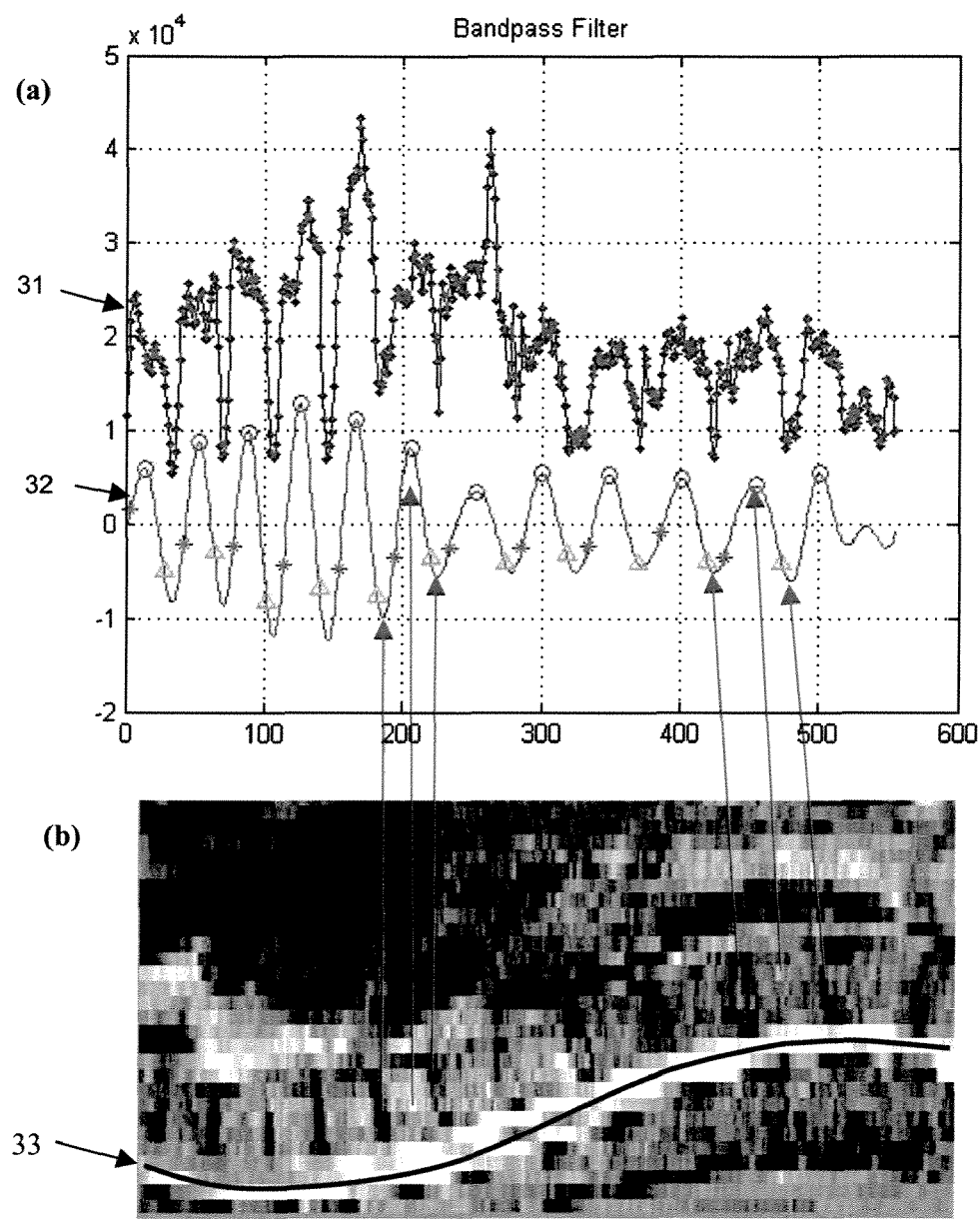
FIGS. 3(a)-(b) illustrates plots of a projected median intensity along a spinal cord and a raw image slice of the spinal column, according to an embodiment of the invention.

While different bands of frequencies or height thresholds could be used in cervical, thoracic and lumbar areas for higher precision, according to an embodiment of the invention the same band is used for the whole vertebrae column. A discrete Fourier transform (DFT) of the projected median intensity is computed using a fast Fourier transform (FFT) algorithm. Next, all elements of the resulting Fourier-space vector that correspond to the frequencies outside of desired range are set to 0. Finally, the inverse Fourier transform is obtained from the Fourier-space vector. The filtered signal is smooth and differentiable, thus finding a minimum and maximums in this signal is easy. For vertebrae segmentation, the minima will correspond to inter-vertebrae spaces and the maxima will correspond to the vertebrae body. FIG. 3(a) illustrates a plot of an unfiltered 31 and a filtered 32 projected median intensity signal along a spinal cord. FIG. 3(b) depicts a raw image slice of the spinal column, with the spinal cord 33 indicated by the sinusoidal curve. The arrows from FIG. 3(b) to the curves graphed in FIG. 3(a) show the correspondence of dark regions to intensity signal minima, and of bright regions to intensity signal maxima.

Referring again to FIG. 11, the upper and lower boundaries of the vertebrae are found at step 113 from the intensity minima and maxima. In general, given a scalar function $f$ of several variables, the conditions for finding local maxima $m_i$ of $f$ are $$\frac{\partial f}{\partial y} = 0 \quad \frac{\partial^2 f}{\partial y^2} < 0 \quad f(y) > 0 \tag{7a}$$

where y is the subsampled location of the spinal cord in the y direction. If two consecutive local maximums are too close, they can be merged together to form a new maximum.

Similarly, the conditions for finding local minima $n_i$ of $f$ are $$\frac{\partial f}{\partial y} = 0 \quad \frac{\partial^2 f}{\partial y^2} > 0 \quad f(y) < 0. \tag{7b}$$

Referring again to FIG. 3(a), in the original, unfiltered signal 12, one searches for two local minima $(u_i, d_i)$ about the middle of each vertebra, $m_i$, which will represent the upper and lower boundary of each vertebra. From $m_i$ to $n_{i-1}$, one searches for the local minimum $u_i$ as the upper boundary for $i^{th}$ vertebra. Similarly, from $m_i$ to $n_{i-1}$, one searches for the local minimum $d_i$ as lower boundary for $i^{th}$ vertebra. Spurious local minima caused by noise are removed by setting an adaptive threshold $t_i$ for each vertebra. That is, the following conditions should be satisfied at $u_i$ and $d_i$: $\theta(u_i)<t_i$, $f(d_i)<t_i$, where $t_i=$ mean$(f(n_{i-1}), \ldots, f(n_{i+1}))$−std$(f(n_{i-1}), \ldots, f(n_{i+1}))$, where std is a standard deviation. Finally, additional constraints are imposed on the searched upper and lower vertebra boundary to maintain minimum height of the vertebrae $T_v$ and inter-vertebrae space $T_s$: $u_i-d_i<T_v$ and $d_{i+1}-u_i>T_s$.

Figure 4:
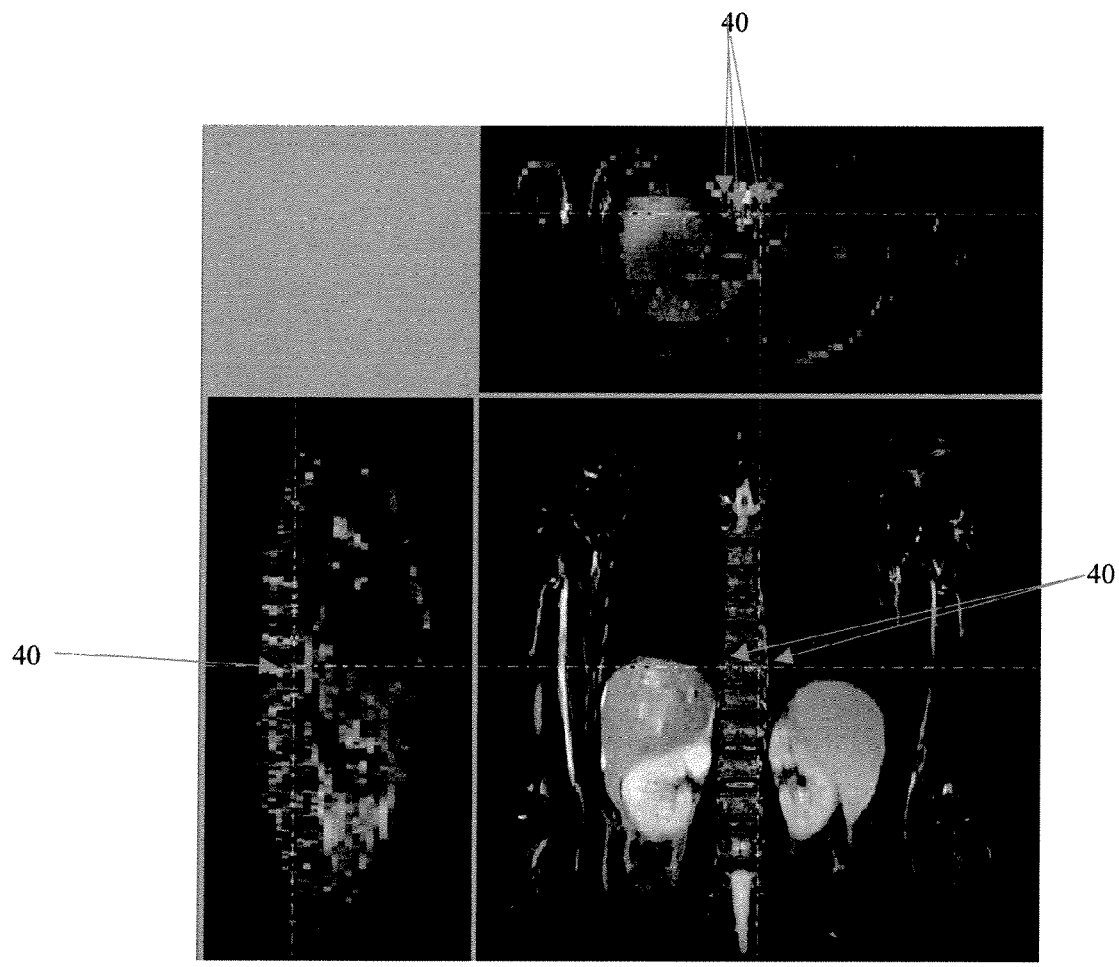
FIG. 4 illustrates a manual measurement of the major and minor axes, according to an embodiment of the invention.
Figure 12:
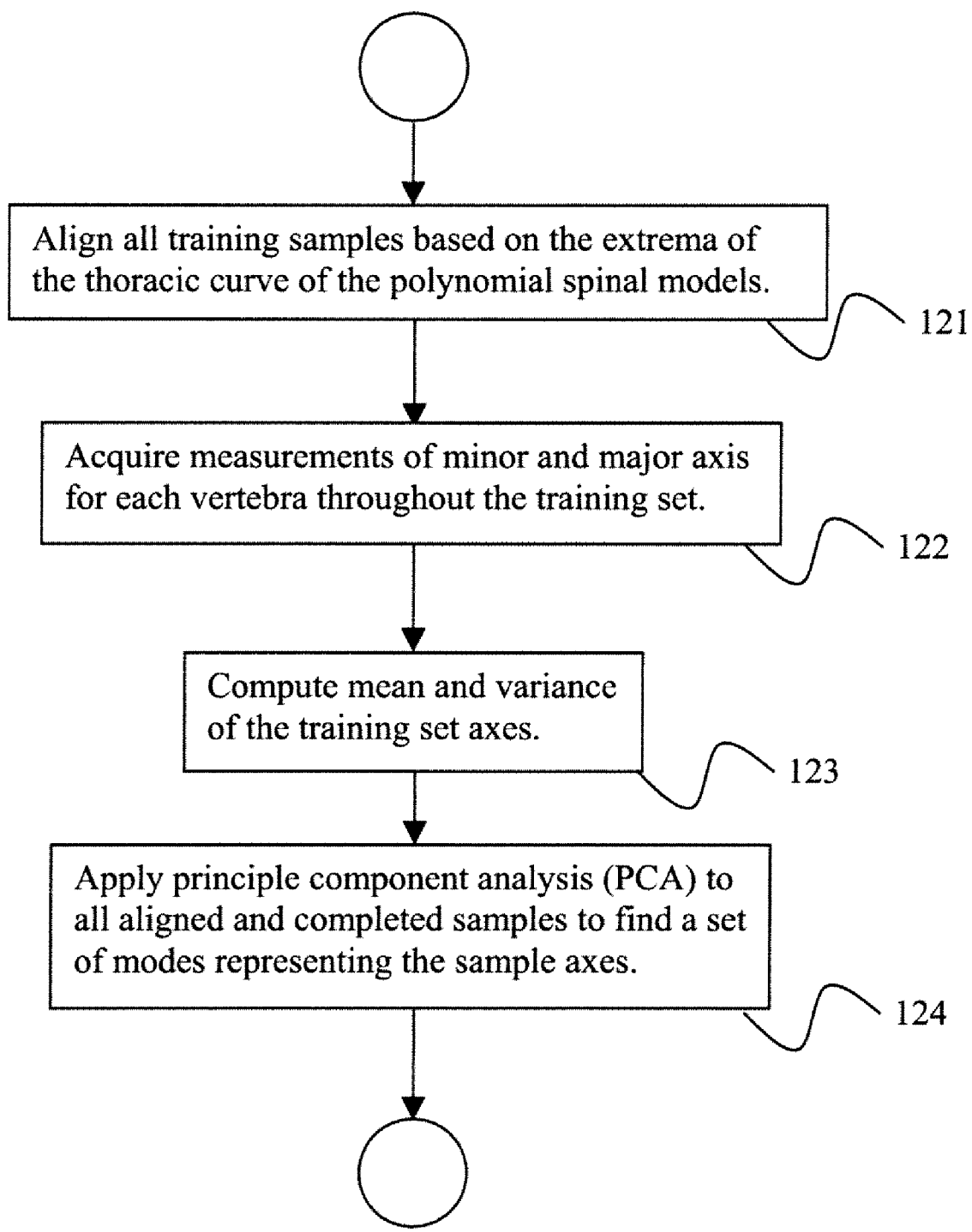
FIG. 12 is a flow chart of a method for creating a parametric vertebrae model, according to an embodiment of the invention.

The next stage, step 93 of FIG. 9, is creating a parametric model for estimating the horizontal extent of the vertebrae through fitting ellipses to the middle sections of each vertebra. A flow chart of a method according to an embodiment of the invention for creating a parametric vertebrae model is depicted in FIG. 12. Referring to the figure, first, at step 121, all training samples x are aligned based on the second extrema (the thoracic curve) of the polynomial models of each spinal cord, that approximately corresponds to 8th thoracic vertebrae. Measurements of minor b and major axis a for each vertebra though out the training set are manually acquired at step 122. FIG. 4 shows 3 orthogonal views of a vertebrae depicting a manual measurement of the vertebrae axes. Each view shows a pair of perpendicular dashed lines that a clinician uses for extracting a measurement from the image, and the x-marks 40 in the views indicate the positions in the image from which measurements are made.

For an incomplete data set with missing vertebrae, the missing vertebrae can be modeled based on data from the longest vertebrae column training sample having all vertebrae present. Alternatively, the missing vertebrae can be modeled based on a mean of those vertebrae present in other training samples.

A typical sample vertebrae is represented by $$x_j = \begin{bmatrix} a_{j1} \\ \ldots \\ a_{jn} \\ b_{j1} \\ \ldots \\ b_{jn} \end{bmatrix};$$

where j is the sample number, the $a_{ji}$ are the major axes, the $b_{ji}$ are the minor axes, for i=1, ..., n, the number of vertebrae. Usually n=24, the number of cervical, thoracic, and lumbar vertebrae.

Referring again to FIG. 12, a sample mean $\bar{x}$ and covariance S are computed at step 123 as $$\bar{x} = \frac{1}{m} \sum_{j=1}^{m} x_j, \quad (8)$$

$$S = \frac{1}{m} \sum_{j=1}^{m} (x_j - \bar{x})(x_j - \bar{x})^T,$$

where m is the number of training samples. Principle component analysis (PCA) is applied at step 124 for all aligned and completed samples $x_j$ to solve the following eigenvalue system:

$$Sp_k = \lambda_k p_k$$

where $p_k$ is a $k^{th}$ principle component mode, $\lambda_k$ is the $k^{th}$ eigenvalue, and k=1, ..., 2n. Only the t modes that satisfy $$\sum_{j=1}^{t} \lambda_j \geq \frac{\text{confidence\_level}}{100\%} \sum_{j}^{2n} \lambda_j, \quad (9)$$

are retained. An exemplary, non-limiting value for confidence_level is about 95%, An arbitrary model sample can be defined in terms of the principle modes as $$x = \bar{x} + Pd \quad (10)$$

where $P=(p_1, \ldots, p_t)$ is a matrix of t eigenvectors, and $d=(d_1, \ldots, d_t)^T$ is model parameter satisfying $$-w\sqrt{\lambda_j} \leq d_j \leq w\sqrt{\lambda_j} \quad (11)$$

for j=1, ..., t and some weighting factor w. According to an embodiment of the invention, the weight factor w can be set to 1 because vertebrae typically show little variation.

Therefore, a new x can be created by $x=\bar{x}+Pd$. The new x generated by these equations will be similar to the training samples during training since model parameters $d_i$ have limited variation.

A fourth stage, step 94 of FIG. 9, of a vertebrae segmentation according to an embodiment of the invention involves fitting ellipses to find the major and minor axes for all vertebrae in a new image. FIG. 6(a) depicts an exemplary thoracic vertebrae, taken from Gray's Anatomy of the Human Body (1918), while FIG. 6(b) is a schematic representation of the vertebrae and the spinal cord. The spinal cord 62 is represented as a cylindrical tube, and the vertebrae 61 is represented as an elliptical cylinder with the major and minor axes as indicated.

Figure 13:
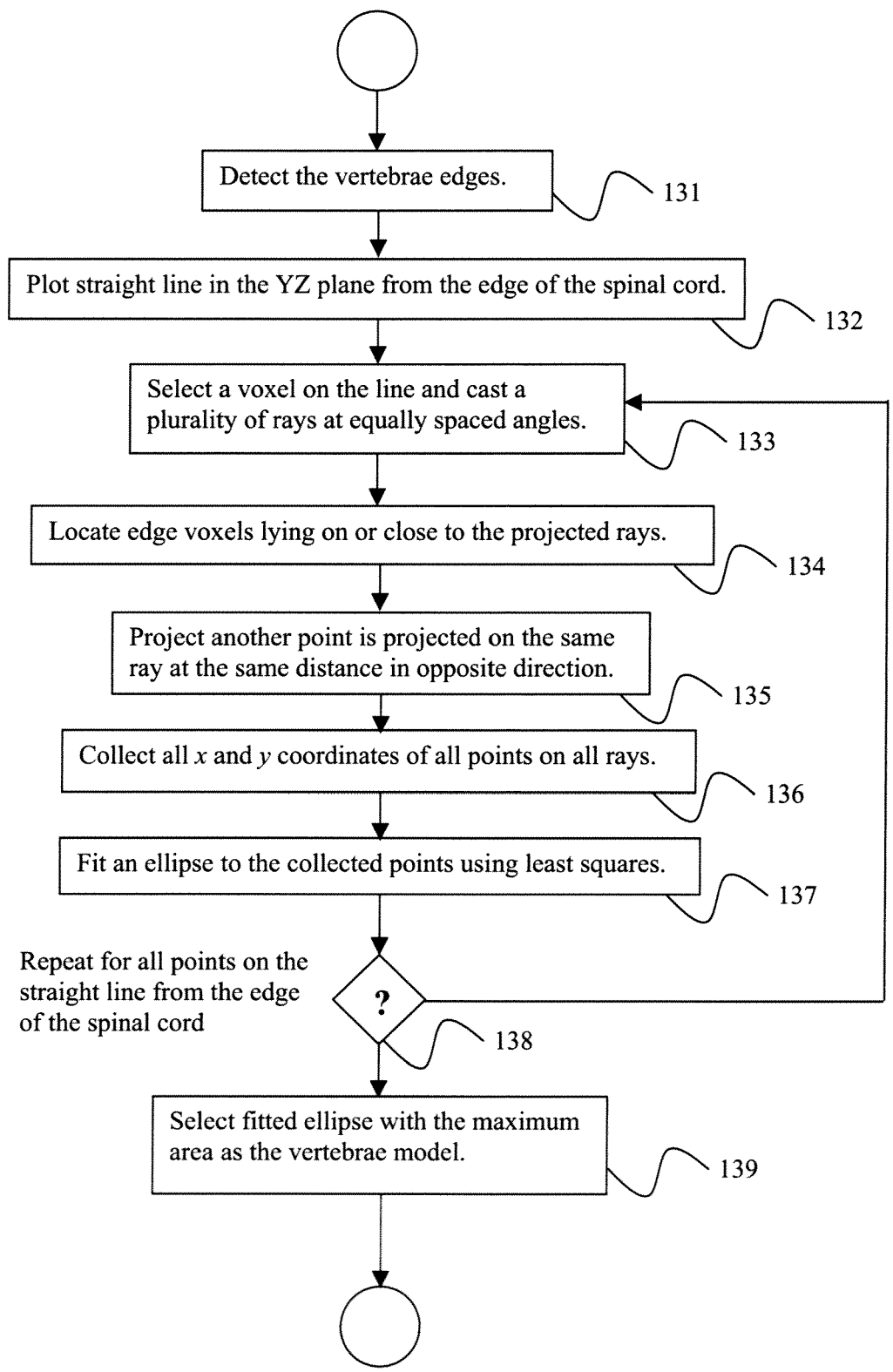
FIG. 13 is a flow chart of a method for fitting ellipses to find the major and minor axes for all vertebrae, according to an embodiment of the invention.

A flow chart of a method according to an embodiment of the invention for fitting ellipses to find the major and minor axes for all vertebrae is depicted in FIG. 13. Referring now to the figure, given a new image, using an edge detection algorithm, the edges of each vertebrae are found at step 131 in the region of interest around the spinal cord in an axial slice perpendicular to the spinal cord. One exemplary, non-limiting edge detection technique according to an embodiment of the invention uses the Canny edge detection algorithm. At step 132, a straight line is plotted into the vertebrae starting from the edge of the spinal cord in a plane orthogonal to the spinal cord. According to an embodiment of the invention, an exemplary, non-limiting line is 4 voxels long. At step 133, a voxel on the line is selected and a plurality m of rays are cast from the voxel in the line at substantially equally spaced angles. According to one non-limiting embodiment of the invention, the rays are cast every 12 degrees in a 180 degree span, for a total 15 rays.

Figure 5:
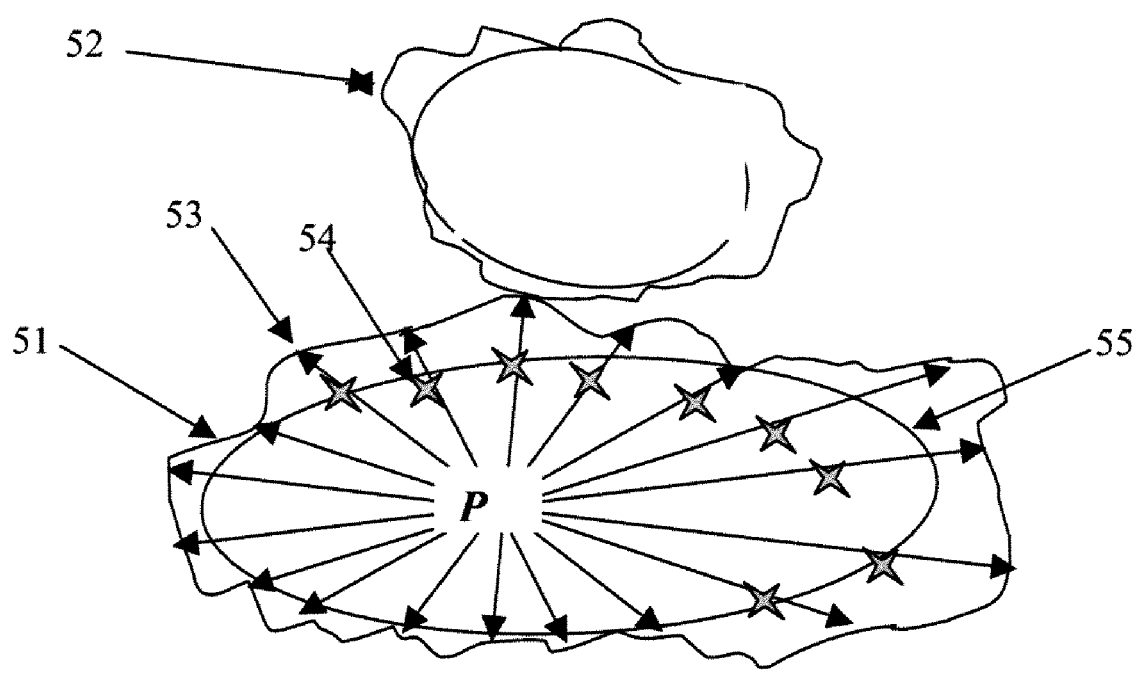
FIG. 5 depicts schematic vertebrae and spinal cord edges with projected points on the rays, according to an embodiment of the invention.

The edge voxels lying on or close to the projected rays are located at step 134. For each ray, the point closest to the ray's beginning point is selected, and at step 135 another point is located at the same distance on a ray projected in the opposite direction. All x and y coordinates of all 2m points, including the original edge points and projected coordinates, are collected on all m rays at step 136. FIG. 5 depicts schematic of a vertebrae boundary 51 and spinal cord 52 with the projected points 53 on the rays 54 cast from point P, with an ellipse 55 embedded within the vertebrae.

Referring again to FIG. 13, at step 137, an ellipse can be fitted to the collected points using a least squares technique. A least squares technique for fitting an ellipse involves minimizing an error function $$\varepsilon = \sum_{i=1}^{2m} \left(1 - \frac{x_i^2}{a^2} - \frac{y_i^2}{b^2}\right),$$

where x and y are the coordinates of the detected and projected edge points translated to the origin p, and m is the number of rays projected from the current center. The error function is minimized by setting the partial derivatives with respect to a and b to 0:

$$\frac{\partial \varepsilon}{\partial a} = 0; \quad \frac{\partial \varepsilon}{\partial b} = 0.$$

Then a and b are computed as:

$$a = \sqrt{\frac{\left(\sum_i^{2m} x_i^2 y_i^2\right)^2 - \sum_i^{2m} x_i^4 \sum_i^{2m} y_i^4}{\sum_i^{2m} x_i^2 y_i^2 \sum_i^{2m} y_i^2 - \sum_i^{2m} x_i^2 \sum_i^{2m} y_i^4}},$$

and $$b = \sqrt{\frac{\left(\sum_i^{2m} x_i^2 y_i^2\right)^2 - \sum_i^{2m} x_i^4 \sum_i^{2m} y_i^4}{\sum_i^{2m} x_i^2 y_i^2 \sum_i^{2m} x_i^2 - \sum_i^{2m} x_i^4 \sum_i^{2m} y_i^2}}.$$

Figure 6:
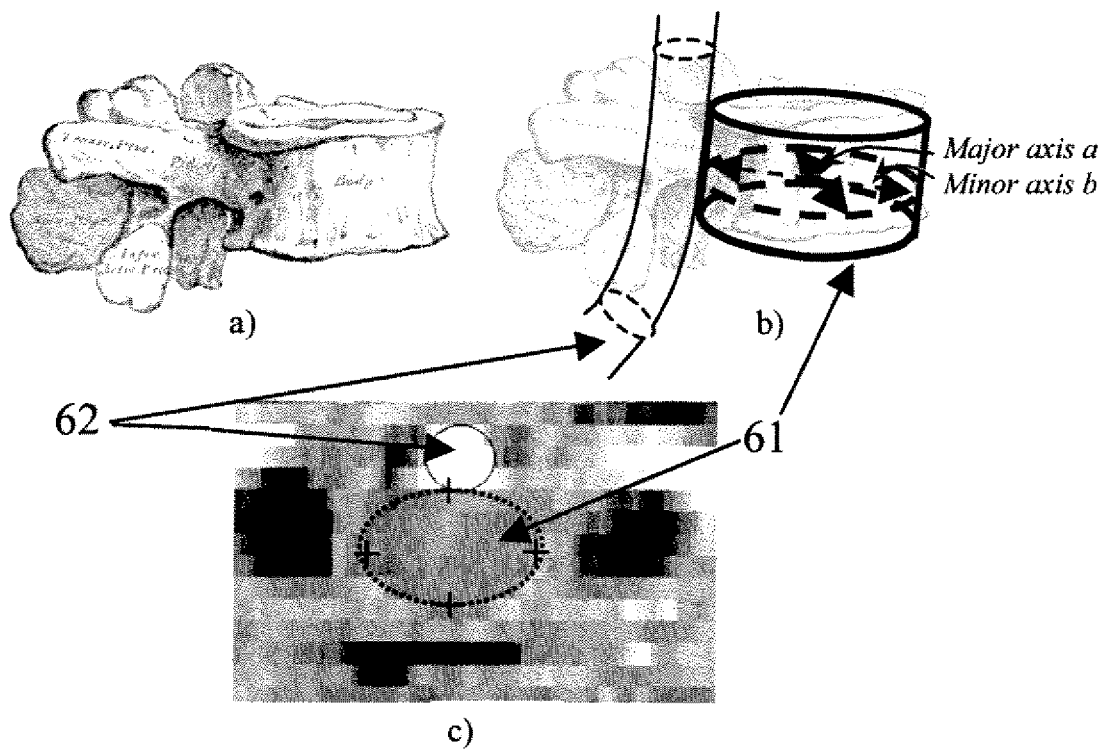
FIGS. 6(a)-(c) depict a thoracic vertebrae and an axial slice through the middle of a vertebrae and the spinal cord with fitted ellipses, according to an embodiment of the invention.

At step 138, this minimization is repeated for all points on the straight line from the edge of the spinal cord, and the fitted ellipse with the maximum area is selected at step 139 as the vertebrae model. FIG. 6(*c*) depicts an axial slice through the middle of a vertebrae 61 and spinal cord 62, both with fitted ellipses, according to an embodiment of the invention.

Figure 14:
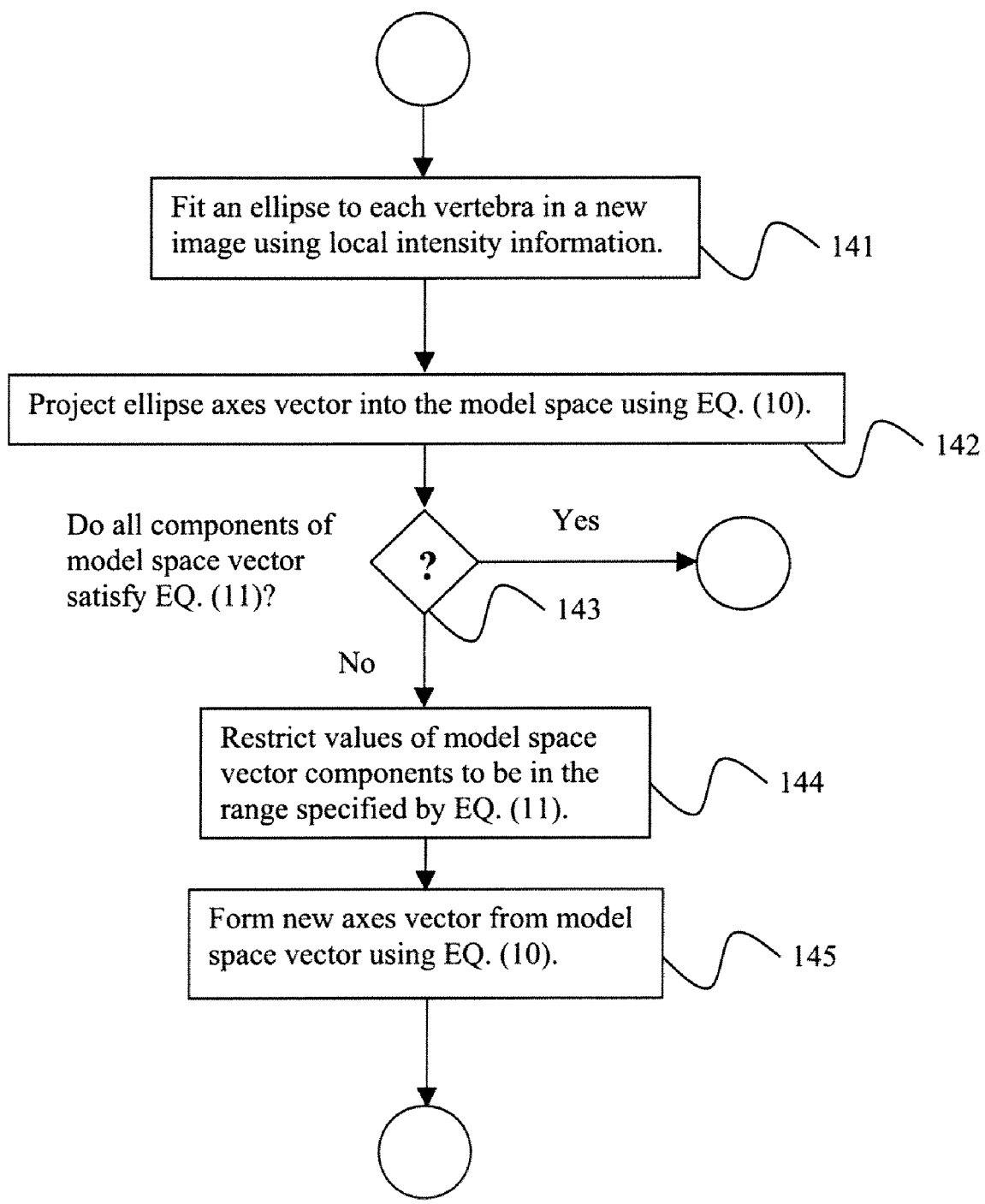
FIG. 14 is a flow chart of a method for applying model constraints to detected ellipses to improve vertebrae segmentation in a new image, according to an embodiment of the invention.

A final stage, step 95 of FIG. 9, of a vertebrae segmentation according to an embodiment of the invention involves applying the model constraints to detected ellipses to improve vertebrae segmentation in a new image. A flow chart of a method according to an embodiment of the invention for applying model constraints to detected ellipses to improve vertebrae segmentation in a new image is depicted in FIG. 14. Referring now to the figure, given a new image, an ellipse for each vertebra can be estimated at step 141 by using local intensity information. An ellipse fitting algorithm according to an embodiment of the invention such as that described above in connection with FIG. 13 is an example of the use of local intensity information for estimating an ellipse. If the vertebrae column image is incomplete, the axis lengths of missing vertebrae can be computed as an average from the training sample. That will yield a vector x' of ellipse axes $$x' = \begin{bmatrix} a'_1 \\ \ldots \\ a'_n \\ b'_1 \\ \ldots \\ b'_n \end{bmatrix}.$$

The vector x' can be projected at step 142 into the model space according to $d=P^{-1}(x'-\bar{x})$. If, at step 143, x' is reasonable, d' will satisfy the model constraints: that is, all components of d' will satisfy the condition $-w\sqrt{\lambda_i} \leq d_i' \leq w\sqrt{\lambda_i}$, for i=1, ..., t. If the condition is not satisfied, the values of d' are restricted at step 144 to be in the range $-w\sqrt{\lambda_i} \leq d_i' \leq w\sqrt{\lambda_i}$. Then, $x_{new} = \bar{x}+Pd'$ is computed at step 145, and $$b=P^{-1}(x_{new}-\bar{x})-\sqrt{\lambda_k} \leq b_k \leq \sqrt{\lambda_k} \qquad (12)$$

The vector x now contains all axes of all vertebrae. Then, for those samples missing vertebrae, the axes lengths for the missing vertebrae that were inserted in the previous step as the average from the training samples are removed.

Figure 7:
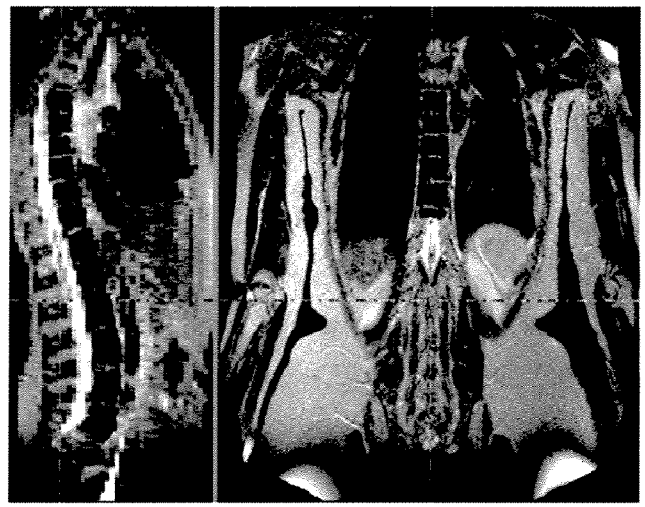
FIGS. 7(a)-(c) depict exemplary vertebrae column segmentation results, according to an embodiment of the invention.
Figure 7:
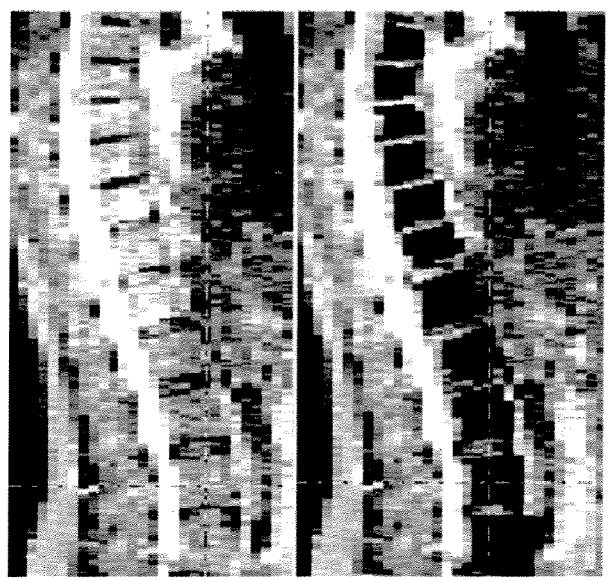
Figure 7:
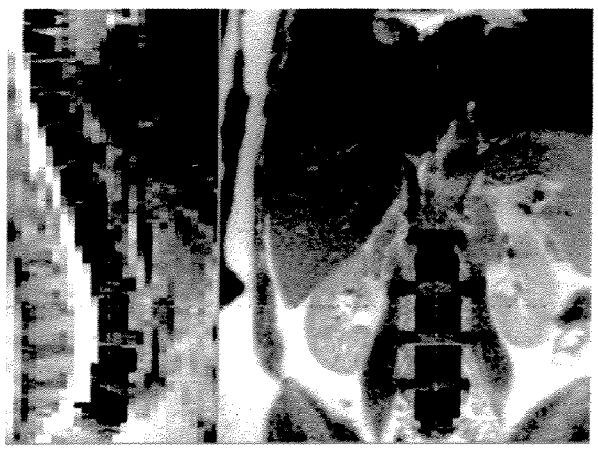

A vertebrae segmentation algorithm according to an embodiment of the invention was visually evaluated on 77 T2 STIR images with different levels of fat suppression and on 5 HASTE images (the HASTE pulse sequence is mainly used for abdominal organs like the liver). In all cases segmentation results were satisfactory. Although intensity distributions for a majority of the organs are very different for T2 STIR and HASTE images, it had no effect on the segmentation results. No changes were made to the algorithm developed originally for T2 STIR images to adapt it for the HASTE pulse sequence. FIGS. 7(*a*)-(*c*) depict vertebrae segmentation results for a coronal T2 STIR image in FIG. 7(*a*), an original (left) and segmented (right) T2 STIR image with metastases in FIG. 7(*b*), and vertebrae segmentation results for a HASTE image in FIG. 7(*c*).

The bandpass filtering can be applied to other anatomical structures. In the case of breast masses, the 1D signal is extracted by a polar transformation of the intensity values inside a circle super-scribing the mass and centered on its center mass of intensity. For a colon fold periodicity analysis, an unwrapped colon surface, a local profile or a distance map of colon surface to either the colon centerline or the local profile can represent the signal for evaluation. For the upper and lower thresholds, for breast masses different bands of frequencies were used to capture the mass specularity at different scales. In the beast mass example, the maximums will be located in the spikes of higher intensity. Colon thresholds can be based on minimum and maximum distances between colon folds. Different sets of thresholds can also be used in different colon segments, as the rectum, sigmoid, descending, transverse, ascending colon and cecum, all have slightly varying fold spacing.

Figure 8:
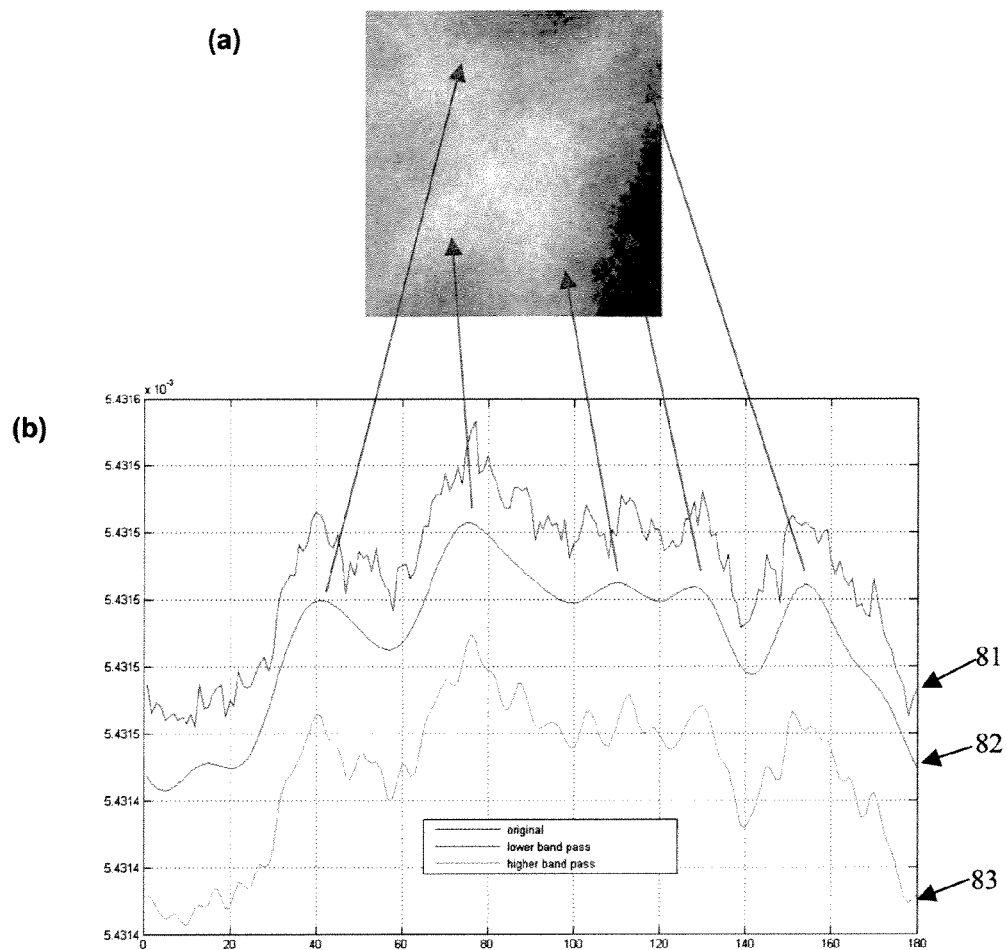
FIGS. 8(a)-(b) depict a breast mass feature extraction using projected median intensity, according to an embodiment of the invention.

FIGS. 8(*a*)-(*b*) depict breast mass feature extraction using projected median intensities. FIG. 8(*a*) depicts a raw image slice from a breast image, while FIG. 8(*b*) illustrates a plot of an unfiltered 81 and a filtered 82 projected median intensity signal using a lower band pass filter, and a filtered 83 projected median intensity signal using a higher band pass filter. The arrows from the curves of FIG. 8(*b*) to the raw image in FIG. 8(*a*) show the correspondence of dark regions to intensity signal minima, and of bright regions to intensity signal maxima.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 15:
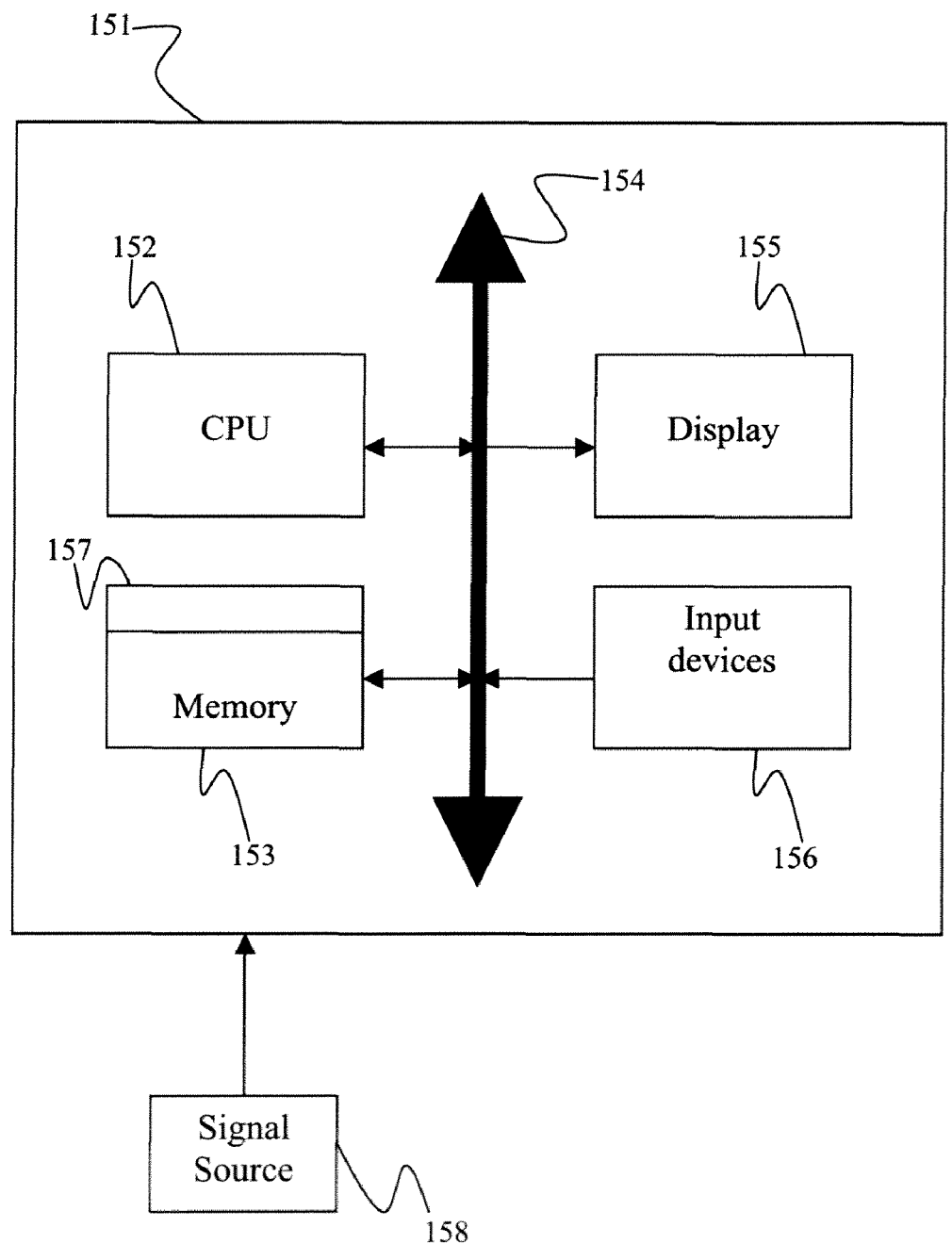
FIG. 15 is a block diagram of an exemplary computer system for implementing a method for detection and segmentation of vertebrae structures in the spine, according to an embodiment of the invention.

FIG. 15 is a block diagram of an exemplary computer system for implementing a method for detection and segmentation of vertebrae structures in the spine according to an embodiment of the invention. Referring now to FIG. 15, a computer system 151 for implementing the present invention can comprise, inter alia, a central processing unit (CPU) 152, a memory 153 and an input/output (I/O) interface 154. The computer system 151 is generally coupled through the I/O interface 154 to a display 155 and various input devices 156 such as a mouse and a keyboard. The support circuits can include circuits such as cache, power supplies, clock circuits, and a communication bus. The memory 153 can include random access memory (RAM), read only memory (ROM), disk drive, tape drive, etc., or a combinations thereof. The present invention can be implemented as a routine 157 that is stored in memory 153 and executed by the CPU 152 to process the signal from the signal source 158. As such, the computer system 151 is a general purpose computer system that becomes a specific purpose computer system when executing the routine 157 of the present invention.

The computer system 151 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for segmenting vertebrae in digitized images comprising the steps of:
   providing a plurality of digitized whole-body images, each said image comprising a plurality of intensities corresponding to a 3-dimensional (3D) grid of points;
   detecting and segmenting a spinal cord using a 3D polynomial spinal model in each of said plurality of images, wherein detecting and segmenting a spinal cord in an image comprises:
   splitting said image into a plurality of sampling bins;
   randomly selecting a subset of these bins;
   randomly selecting one sample point from each selected bin;
   computing coefficient vectors for said 3D polynomial spinal model evaluated at each selected sample point;
   computing, based on the coefficient vectors, extrema points for said 3D polynomial spinal model; and
   evaluating said 3D polynomial spinal model in a local neighborhood volume of bright points within a curved cylinder built around said polynomial, if said extrema points satisfy pre-defined constraints;
   finding a height of each vertebrae in each image from intensity projections along said spinal cord; and
   building a parametric model of a vertebrae from said plurality of images.

2. The method of claim 1, wherein if said local neighborhood volume is greater than a predefined minimum spinal cord volume, refining the coefficient vectors using least-squares and taking into account only those points within a neighborhood of the 3D polynomial spinal model, evaluating said 3D polynomial spinal model in said local neighborhood volume, and comparing the evaluation results to the total volume of the bright points within the curved polynomial spinal model.

3. The method of claim 2, further comprising repeating said steps of randomly selecting a subset of these bins, randomly selecting one sample point from each bin, computing coefficient vectors, and evaluating said 3D polynomial spinal model until either the ratio of said volume to the total volume bright points is greater than a pre-determined threshold or the number of repeats has exceed a pre-determined maximum.

4. The method of claim 1, wherein said 3D polynomial spinal model is defined by $$\begin{cases} x(t) = \sum_{i=0}^{n} a_{xi} t^i, \\ z(t) = \sum_{i=0}^{n} a_{zi} t^i, \\ y(t) \approx t, \end{cases}$$

wherein n is the polynomial order, x(t) represents a variation in the spinal curve in a coronal orientation, and z(t) represents a variation in the spinal curve in a sagittal orientation, wherein said extrema points are defined by $$x'(t) = \sum_{i=1}^{n} a_{xi} i t^{i-1} = 0 \Rightarrow (x_{cj}, y_{cj}),$$

$$z'(t) = \sum_{i=1}^{n} a_{zi} i t^{i-1} = 0 \Rightarrow (z_{sj}, y_{sj}),$$

where $(x_{cj}, y_{cj})$ are extrema points in coronal orientation, $(z_{sj}, y_{sj})$ in the sagittal orientation, and $j=1, \ldots, n-1$, and wherein said subset of bins has $(n+1)$ bins.

5. The method of claim 4, wherein said coefficient vectors are constrained to satisfy $$\text{if} \begin{cases} a_{zn} < 0 \\ n \text{ is even} \end{cases}, \text{ then } z(t) \to -\infty,$$

and said constraints satisfied by said extrema are defined by $$|z_{sj} - z_{sj+1}| < LK_{j,j+1},$$

$$D_{j,j+1 \, min} < |y_{sj} - y_{sj+1}| < D_{j,j+1 \, max}$$

wherein $\lfloor D_{j,j+1 \, min}, D_{j,j+1 \, max} \rfloor$ are natural limits of a longitudinal distance and $LK_{j,j+1}$ is a posterior-anterior distance in a spinal curve, and $$|x_{sj} - x_{sj+1}| < S_c$$

wherein $S_c$ is a scoliosis pathology limit observed from said plurality of images, and wherein the $\lfloor D_{j,j+1 \, min}, D_{j,j+1 \, max} \rfloor$ and $LK_{j,j+1}$ limits were set by an expert radiologist.

6. The method of claim 1, wherein finding a height of a vertebrae from intensity projections along said spinal cord comprises:
   extracting a one-dimensional (1D) signal representing said spinal cord by projecting median intensity values along the spinal cord inside small sample circles adjacent to the front edge of the spinal cord within planes orthogonal to said spinal cord;
   filtering said 1D signal with a minimum rank filter having a width between a largest inter-vertebra space and a shortest vertebrae to be detected; and
   finding upper and lower boundaries of said vertebrae from intensity minima and maxima of the filtered 1D signal.

7. The method of claim 6, further comprising removing spurious local minima caused by noise by setting an adaptive threshold $t_i$ for each vertebra satisfying $f(u_i) < t_i$, $f(d_i) < t_i$, wherein f is said filtered 1D signal, $(u_i, d_i)$ are two local minima about the middle of each vertebra, and $t_i$=mean($f(n_{i-1}), \ldots, f(n_{i+1})$)−std($f(n_{i-1}), \ldots, f(n_{i+1})$), where std is a standard deviation, and $n_i$ is a local minima off, and imposing constraints $u_i - d_i < T_v$ and $d_{i+1} - u_i > T_s$ on said upper and lower vertebra boundary to maintain a minimum height of the vertebrae $T_v$ and inter-vertebrae space $T_s$.

8. The method of claim 1, wherein building a parametric model of a vertebrae comprises:

aligning all vertebrae in said plurality of images based on an extrema of a thoracic curve of said 3D polynomial spinal model;

acquiring measurements of minor and major axis for each vertebra throughout plurality of images, wherein a typical sample vertebrae is represented by $$x_j = \begin{bmatrix} a_{j1} \\ \ldots \\ a_{jn} \\ b_{j1} \\ \ldots \\ b_{jn} \end{bmatrix};$$

wherein j is a sample number, $a_{ji}$ are the major axes, $b_{ji}$ are the minor axes, for i=1, ..., n, the number of vertebrae;

computing a mean $$\bar{x} = \frac{1}{m} \sum_{j=1}^{m} x_j$$

and covariance S of the major and minor axes for each vertebrae across said plurality of images;

using principle component analysis to find a set of modes representing the sample axes by solving $Sp_k = \lambda_k \cdot p_k$, wherein an arbitrary model sample x is defined in terms of the principle modes as $x = \bar{x} + Pd$, where $P = (p_1, \ldots, p_t)$ is a matrix of t eigenvectors, and $d = (d_1, \ldots, d_t)^T$ is the model parameter.

9. The method of claim 8, comprising retaining only those t modes that satisfy $$\sum_{j=1}^{t} \lambda_j \geq \frac{\text{confidence\_level}}{100\%} \sum_{j}^{2n} \lambda_j,$$

for a pre-defined value of confidence_level, and wherein the model parameter d satisfies $-\sqrt{\lambda_j} \leq d_j \leq \sqrt{\lambda_j}$, for j=1, ..., t.

10. The method of claim 1, further comprising:

providing a new digitized whole-body image including a spinal cord;

fitting an ellipse to each vertebrae of said spinal cord to find the major and minor axes; and applying model parameter constraints to the major and minor axes in the new image based on said parametric model to segment said vertebrae.

11. The method of claim 10, wherein fitting an ellipse to each vertebrae comprises:

detecting edges of the vertebrae;

plotting a straight line into the vertebrae in a plane orthogonal to the spinal cord starting from the edge of the spinal cord;

selecting a point on the line;

projecting a plurality of rays from the selected point at substantially equally spaced angles over a substantially semi-circular span;

locating edge points lying on or close to the projected rays and selecting a point closest to the selected line point;

locating an opposite point to the selected point at a same distance on a ray projected in an opposite direction, for each ray;

collecting the 2D coordinates of all selected and opposite points on all rays; and fitting an ellipse to the collected points using a least squares technique.

12. The method of claim 11, further comprising repeating said steps of selecting a point on the line, projecting a plurality in of rays, locating edge points, locating an opposite point, collecting the 2D coordinates, and fitting an ellipse for all points on said line, and selecting a fitted ellipse with a maximum area as a vertebrae model.

13. The method of claim 10, wherein applying model parameter constraints to the major and minor axes comprises:

projecting an vector x' of the major and minor axes for the whole vertebrae into a model space according to $d = P^{-1}(x' - \bar{x})$ wherein x is a mean $$\bar{x} = \frac{1}{m} \sum_{j=1}^{m} x_j, P = (p_1, \ldots, p_t)$$

is a matrix of t model eigenvectors, and $d = (d_1, \ldots, d_t)^T$ is a model parameter, wherein if all components of d do not satisfy the model constraints $-\sqrt{\lambda_i} \leq d_i \leq \sqrt{\lambda_i}$, for i=1, ..., t, wherein $\lambda_i$ are eigenvalues of $Sp_k = \lambda_k p_k$ wherein S is a covariance matrix of $\bar{x}$, then restricting values of d to be in said range, and computing a new axes vector $x'' = \bar{x} + Pd$ using the restricted values of d.

14. The method of claim 13, wherein if a vertebrae is missing in said new image, computing axis lengths of said missing vertebrae as an average from corresponding vertebrae in the plurality of images, and after applying constraints to detected ellipses, removing those components from the axes vector that correspond to the missing vertebrae.

15. A method for segmenting vertebrae in digitized images comprising the steps of:

providing a digitized whole-body image including a spinal column, said image comprising a plurality of intensities corresponding to a 3-dimensional grid of points;

fitting an ellipse to each vertebrae in the spinal column to find the major and minor axes of each vertebrae; and projecting a vector x' of said major and minor axes for each vertebrae into a model space according to $d = P^{-1}(x' - \bar{x})$ wherein $\bar{x}$ is a mean $$\bar{x} = \frac{1}{m} \sum_{j=1}^{m} x_j, P = (p_1, \ldots, p_t)$$

is a matrix of t model eigenvectors, and $d = (d_1, \ldots, d_t)^T$ is a model parameter, wherein if all components of d do not satisfy model parameter constraints $-\sqrt{\lambda_i} \leq d_i \leq \sqrt{\lambda_i}$, for i=1, ..., t, wherein $\lambda_i$ are eigenvalues of $Sp_k = \lambda_k p_k$ wherein S is a covariance matrix of $\bar{x}$, then restricting values of d to be in said range, and computing a new axes vector $x''=\bar{x}+Pd$ using the restricted values of d.

16. The method of claim 15, wherein fitting an ellipse to each vertebrae in the spinal column comprises:
   detecting edges of the vertebrae;
   plotting a straight line into the vertebrae in a plane orthogonal to the spinal cord starting from the edge of the spinal cord;
   selecting a point on the line;
   projecting a plurality m of rays from the selected point at substantially equally spaced angles over a substantially semi-circular span;
   locating edge points lying on or close to the projected rays and selecting a point closest to the selected line point;
   locating an opposite point to the selected point at a same distance on a ray projected in an opposite direction, for each ray;
   collecting the 2D coordinates of all selected and opposite points on all rays; and
   fitting an ellipse to the collected points using a least squares technique.

17. The method of claim 15, further comprising:
   providing a plurality of digitized whole-body images, each said image comprising a plurality of intensities corresponding to a 3-dimensional grid of points;
   detecting and segmenting a spinal cord using a 3D polynomial spinal model in each of said plurality of images;
   finding a height of each vertebrae in each image from intensity projections along said spinal cord;
   aligning all vertebrae in said plurality of images based on an extrema of a thoracic curve of said 3D polynomial spinal model;
   acquiring measurements of minor and major axis for each vertebra throughout plurality of images, wherein a typical sample vertebrae is represented by $$x_j = \begin{bmatrix} a_{j1} \\ \dots \\ a_{jn} \\ b_{j1} \\ \dots \\ b_{jn} \end{bmatrix};$$

wherein j is a sample number, $a_{jn}$ are the major axes, $b_{ji}$ are the minor axes, for i=1, ..., n, the number of vertebrae;
   computing a mean $$\bar{x} = \frac{1}{m}\sum_{j=1}^{m} x_j$$

and covariance S of the major and minor axes for each vertebrae across said plurality of images; and
   using principle component analysis to find a set of modes representing the sample axes by solving $Sp_k=\lambda_k p_k$, wherein an arbitrary model sample x is defined in terms of the principle modes as $x=\bar{x}+Pd$ where $P=(p_i, \dots, p_t)$ is a matrix of t eigenvectors, and $d=(d_i, \dots, d_t)^T$ is the model parameter.

18. The method of claim 17, comprising retaining only those t modes that satisfy $$\sum_{j=1}^{t} \lambda_j \geq \frac{\text{confidence\_level}}{100\%} \sum_{j}^{2n} \lambda_j, \quad (9)$$

for a predetermined value of confidence_level, and wherein the model parameter d satisfies $-\sqrt{\lambda_j} \leq d_j \leq \sqrt{\lambda_j}$, for j=1, ..., t.

19. The method of claim 17, wherein said 3D polynomial spinal model is defined by $$\begin{cases} x(t) = \sum_{i=0}^{n} a_{xi} t^i, \\ z(t) = \sum_{i=0}^{n} a_{zi} t^i, \\ y(t) \approx t, \end{cases}$$

wherein n is the polynomial order, x(t) represents a variation in the spinal curve in a coronal orientation, and z(t) represents a variation in the spinal curve in a sagittal_orientation, and wherein said coefficient vectors are constrained to satisfy $$\text{if} \begin{cases} a_{zn} < 0 \\ n \text{ is even,} \end{cases} \text{then } z(t) \to -\infty.$$

20. A non-transitory program storage device readable by a computer, tangibly embodying a program of instructions executable by the computer to perform the method steps for segmenting vertebrae in digitized images, said method comprising the steps of:
   providing a plurality of digitized whole-body images, each said image comprising a plurality of intensities corresponding to a 3-dimensional (3D) grid of points;
   detecting and segmenting a spinal cord using a 3D polynomial spinal model in each of said plurality of images, wherein detecting and segmenting a spinal cord in an image comprises:
      splitting said image into a plurality of sampling bins;
      randomly selecting a subset of these bins;
      randomly selecting one sample point from each selected bin;
      computing coefficient vectors for said 3D polynomial spinal model evaluated at each selected sample point;
      computing, based on the coefficient vectors, extrema points for said 3D polynomial spinal model; and
      evaluating said 3D polynomial spinal model in a local neighborhood volume of bright points within a curved cylinder built around said polynomial, if said extrema points satisfy pre-defined constraints;
   finding a height of each vertebrae in each image from intensity projections along said spinal cord; and
   building a parametric model of a vertebrae from said plurality of images.

21. The computer readable program storage device of claim 20, wherein if said local neighborhood volume is greater than a predefined minimum spinal cord volume, refining the coefficient vectors using least-squares and taking into account only those points within a neighborhood of the 3D polynomial spinal model, evaluating said 3D polynomial spinal model in said local neighborhood volume, and comparing the evaluation results to the total volume of the bright points within the curved polynomial spinal model.

22. The computer readable program storage device of claim 21, the method further comprising repeating said steps of randomly selecting a subset of these bins, randomly selecting one sample point from each bin, computing coefficient vectors, and evaluating said 3D polynomial spinal model until either the ratio of said volume to the total volume bright points is greater than a pre-determined threshold or the number of repeats has exceed a pre-determined maximum.

23. The computer readable program storage device of claim 20, wherein said 3D polynomial spinal model is defined by $$\begin{cases} x(t) = \sum_{i=0}^{n} a_{xi} t^i, \\ z(t) = \sum_{i=0}^{n} a_{zi} t^i, \\ y(t) \approx t, \end{cases}$$

wherein n is the polynomial order, x(t) represents a variation in the spinal curve in a coronal orientation, and z(t) represents a variation in the spinal curve in a sagittal orientation, wherein said extrema points are defined by $$x'(t) = \sum_{i=1}^{n} a_{xi} i t^{i-1} = 0 \Rightarrow (x_{cj}, y_{cj}),$$

$$z'(t) = \sum_{i=1}^{n} a_{zi} i t^{i-1} = 0 \Rightarrow (z_{sj}, y_{sj}),$$

where $(x_{cj}, y_{cj})$ are extrema points in coronal orientation, $(z_{sj}, y_{sj})$ in the sagittal_orientation, and j=1, ..., n−1, and wherein said subset of bins has (n+1) bins.

24. The computer readable program storage device of claim 23, wherein said coefficient vectors are constrained to satisfy $$\text{if} \begin{cases} a_{zn} < 0 \\ n \text{ is even,} \end{cases} \text{then } z(t) \to -\infty.$$

and said constraints satisfied by said extrema are defined by $$|z_{sj} - z_{sj+1}| < LK_{j,j+1},$$

$$D_{j,j+1\ min} < |y_{sj} - y_{sj+1}| < D_{j,j+1\ max}$$

wherein $\lfloor D_{j,j+1\ min}, D_{j,j+1\ max} \rfloor$ are natural limits of a longitudinal distance and $LK_{j,j+1}$ is a posterior-anterior distance in a spinal curve, and $$|x_{sj} - x_{sj+1}| < S_c$$

wherein $S_c$ is a scoliosis pathology limit observed from said plurality of images, and wherein the $\lfloor D_{j,j+1\ min}, D_{j,j+1\ max} \rfloor$ and $LK_{j,j+1}$ limits were set by an expert radiologist.

25. The computer readable program storage device of claim 20, wherein finding a height of a vertebrae from intensity projections along said spinal cord comprises:

extracting a one-dimensional (1D) signal representing said spinal cord by projecting median intensity values along the spinal cord inside small sample circles adjacent to the front edge of the spinal cord within planes orthogonal to said spinal cord;

filtering said 1D signal with a minimum rank filter having a width between a largest inter-vertebra space and a shortest vertebrae to be detected; and finding upper and lower boundaries of said vertebrae from intensity minima and maxima of the filtered 1D signal.

26. The computer readable program storage device of claim 25, the method further comprising removing spurious local minima caused by noise by setting an adaptive threshold $t_i$ for each vertebra satisfying $f(u_i) < t_i$, $f(d_i) < t_i$, wherein f is said filtered 1D signal, $(u_i, d_i)$ are two local minima about the middle of each vertebra, and $t_i = \text{mean}(f(n_{i-1}), \ldots, f(n_{i+1})) - \text{std}(f(n_{i-1}), \ldots, f(n_{i+1}))$, where std is a standard deviation, and $n_i$ is a local minima off and imposing constraints $u_i - d_i < T_v$ and $d_{i+1} - u_i > T_s$ on said upper and lower vertebra boundary to maintain a minimum height of the vertebrae $T_v$ and inter-vertebrae space $T_s$.

27. The computer readable program storage device of claim 20, wherein building a parametric model of a vertebrae comprises:

aligning all vertebrae in said plurality of images based on an extrema of a thoracic curve of said 3D polynomial spinal model;

acquiring measurements of minor and major axis for each vertebra throughout plurality of images, wherein a typical sample vertebrae is represented by $$x_j = \begin{bmatrix} a_{j1} \\ \ldots \\ a_{jn} \\ b_{j1} \\ \ldots \\ b_{jn} \end{bmatrix};$$

wherein j is a sample number, $a_{ji}$ are the major axes, $b_{ji}$ are the minor axes, for i=1, ..., n, the number of vertebrae;

computing a mean $$\bar{x} = \frac{1}{m} \sum_{j=1}^{m} x_j$$

and covariance S of the major and minor axes for each vertebrae across said plurality of images;

using principle component analysis to find a set of modes representing the sample axes by solving $Sp_k = \lambda_k p_k$, wherein an arbitrary model sample x is defined in terms of the principle modes as $x = \bar{x} + Pd$, where $P = (p_i, \ldots, p_t)$ is a matrix of t eigenvectors, and $d = (d_i, \ldots, d_t)^T$ is the model parameter.

28. The computer readable program storage device of claim 27, the method comprising retaining only those t modes that satisfy $$\sum_{j=1}^{t} \lambda_j \geq \frac{\text{confidence\_level}}{100\%} \sum_{j}^{2n} \lambda_j,$$

for a predetermined value of confidence_level, and wherein the model parameter d satisfies $-\sqrt{\lambda_j} \leq d_j \leq \sqrt{\lambda_j}$, for j=1, ..., t.

29. The computer readable program storage device of claim 20, the method further comprising:
providing a new digitized whole-body image including a spinal cord;
fitting an ellipse to each vertebrae of said spinal cord to find the major and minor axes; and
applying model parameter constraints to the major and minor axes in the new image based on said parametric model to segment said vertebrae.

30. The computer readable program storage device of claim 29, wherein fitting an ellipse to each vertebrae comprises:
detecting edges of the vertebrae;
plotting a straight line into the vertebrae in a plane orthogonal to the spinal cord starting from the edge of the spinal cord;
selecting a point on the line;
projecting a plurality of rays from the selected point at substantially equally spaced angles over a substantially semi-circular span;
locating edge points lying on or close to the projected rays and selecting a point closest to the selected line point;
locating an opposite point to the selected point at a same distance on a ray projected in an opposite direction, for each ray;
collecting the 2D coordinates of all selected and opposite points on all rays; and
fitting an ellipse to the collected points using a least squares technique.

31. The computer readable program storage device of claim 30, the method further comprising repeating said steps of selecting a point on the line, projecting a plurality m of rays, locating edge points, locating an opposite point, collecting the 2D coordinates, and fitting an ellipse for all points on said line, and selecting a fitted ellipse with a maximum area as a vertebrae model.

32. The computer readable program storage device of claim 29, wherein applying model parameter_constraints to the major and minor axes comprises:
projecting an vector x' of major and minor axes for the whole vertebrae into a model space according to $d=P^{-1}(x'-\bar{x})$ wherein $\bar{x}$ is a mean $$\bar{x} = \frac{1}{m}\sum_{j=1}^{m} x_j, P = (p_1, \ldots, p_t)$$

is a matrix of t model eigenvectors, and $d=(d_1, \ldots, d_t)^T$ is a model parameter,
wherein if all components of d do not satisfy the model parameter_constraints $-\sqrt{\lambda_i} \leq d_i \leq \sqrt{\lambda_i}$, for i=1, ..., t, wherein $\lambda_i$ eigenvalues of $Sp_k = \lambda_k p_k$ wherein S is a covariance matrix of $\bar{x}$, then restricting values of d to be in said range, and computing a new axes vector $x''=\bar{x}+Pd$ using the restricted values of d.

33. The computer readable program storage device of claim 32, wherein if a vertebrae is missing in said new image, computing axis lengths of said missing vertebrae as an average from corresponding vertebrae in the plurality of images, and after applying constraints to detected ellipses, removing those components from the axes vector that correspond to the missing vertebrae.

* * * * *